US012632065B1

(12) United States Patent
Massey et al.

(10) Patent No.: US 12,632,065 B1
(45) Date of Patent: May 19, 2026

(54) FORECASTING WIND CONDITIONS FOR OPERATIONS OF UNCREWED AERIAL VEHICLES

(71) Applicant: Amazon Technologies, Inc., Seattle, WA (US)

(72) Inventors: Jeffrey Massey, Issaquah, WA (US); Marco Giovanni Giometto, New York, NY (US); John Colton Moriarty, Seattle, WA (US); Raymond Kim, Seattle, WA (US); Yanzhe Yin, Bellevue, WA (US); Tarun Sai Ganesh Nerella, Seattle, WA (US); Vineet Vilas Amonkar, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 155 days.

(21) Appl. No.: 18/621,531

(22) Filed: Mar. 29, 2024

(51) Int. Cl.
| | |
|---|---|
| G05D 1/606 | (2024.01) |
| G01P 5/00 | (2006.01) |
| G05D 109/20 | (2024.01) |

(52) U.S. Cl.
CPC .............. G05D 1/606 (2024.01); G01P 5/001 (2013.01); G05D 2109/20 (2024.01)

(58) Field of Classification Search
CPC ..... G05D 1/606; G05D 2109/20; G01P 5/001
See application file for complete search history.

(56) References Cited

U.S. PATENT DOCUMENTS

| | | | |
|---|---|---|---|
| 8,401,726 | B2 | 3/2013 | Bouvier et al. |
| 8,554,458 | B2 | 10/2013 | Sawhill et al. |
| 8,565,943 | B2 | 10/2013 | Weinmann et al. |
| 8,620,714 | B2 | 12/2013 | Williams et al. |
| 2014/0088799 | A1 | 3/2014 | Tino et al. |
| 2017/0323274 | A1 | 11/2017 | Johnson et al. |
| 2019/0101934 | A1 | 4/2019 | Tuukkanen et al. |
| 2022/0128996 | A1 | 4/2022 | Tsurumi |

(Continued)

OTHER PUBLICATIONS

Cava, Daniela and Katul, Gabriel G. Spectral Short-circuiting and Wake Production within the Canopy Trunk Space of an Alpine Hardwood Forest. Boundary-Layer Meteorology, 126:415-431, 2008. ISSN 00068314. doi: 10.1007/s10546-007-9246-x. Accessed Mar. 29, 2023, URL: https://nicholas.duke.edu/people/faculty/katul/BLM_Cava_2008b.pdf.

(Continued)

*Primary Examiner* — Michael D Lang
(74) *Attorney, Agent, or Firm* — Athorus, PLLC

(57) ABSTRACT

Grids representing predictions of wind vectors (or velocities) over a ground region are obtained from a model and downscaled to a greater level of resolution based on surface roughness metrics of the ground region. Observations of wind vectors over the ground region are determined from ground-based or airborne systems and assimilated into the grids. Subsequently, grids representing the assimilated wind vectors at an initial time, and the predictions of wind vectors at future times, are provided as inputs to a machine learning model, such as a gradient-boosted decision trees algorithm, along with the surface roughness metrics and other relevant features. A continuous representation of predicted wind vectors over the ground region generated based on outputs received from the model is utilized to make operational decisions regarding an aerial vehicle.

20 Claims, 21 Drawing Sheets

INITIAL GRID FOR MODELING WIND AT TIME $t_0$

(56) References Cited

U.S. PATENT DOCUMENTS

| | | |
|---|---|---|
| 2023/0306857 A1 | 9/2023 | Hayakawa |
| 2023/0343226 A1 | 10/2023 | Bieringer et al. |
| 2024/0046804 A1* | 2/2024 | Robinson ................. G08G 5/76 |
| 2024/0185731 A1 | 6/2024 | Büddefeld et al. |

OTHER PUBLICATIONS

European Centre for Medium-Range Weather Forecasts (ECMWF), available at www.ecmwf.int (last visited Mar. 29, 2024), URL: https://www.ecmwf.int/.

Giometto, M. G., Christen, A., Egli, P. E., Schmid, M. F., Tooke, R. T., Coops, N. C., & Parlange, M. B. Effects of trees on mean wind, turbulence and momentum exchange within and above a real urban environment. Advances in Water Resources, 106:154-168, 2017.

Global Systems Laboratory, "The High-Resolution Rapid Refresh (HRRR)," National Oceanic and Atmospheric Administration, U.S. Department of Commerce, available at URL: https://rapidrefresh.noaa.gov (last visited Mar. 29, 2024).

Kolmogorov, Andrei Nikolaevich. The local structure of turbulence in incompressible viscous fluid for very large Reynolds numbers. Doklady Akademiia Nauk SSSR, 30:301-305, 1941. ISSN 13645021. doi: 10.1098/rspa.1991.0075. Accessed Mar. 29, 2023, URL: https://www.ams.jhu.edu/~eyink/Turbulence/classics/Kolmogorov41a.pdf.

Sorbjan, Zbigniew. Large-Eddy Simulations of the Baroclinic Mixed Layer. Boundary-Layer Meteorology, 112:57-80, 2004. ISSN 00068314. doi: 10.1023/B:BOUN.0000020161.99887.b3.

Stull, Roland B. An Introduction to Boundary Layer Meteorology. Atmospheric Sciences Library. Springer, Kluwer Academic Publishers, Dordrecht, The Netherlands, 1988. ISBN 978-90-277-2769-5. doi: 10.1007/978-94-009-3027-8.

DeBonis, James R., "WRLES: Wave Resolving Large-Eddy Simulation Code, Theory and Usage," May 2019, NASA/TM-2019-220192 (Year: 2019).

Gao, X-W., et al., "Free element collocation method: A new method combining advantages of finite element and mesh free methods," 2019, Computers & Structures. 215, pp. 10-26 (Year: 2019).

Wang, Biao, "Urban Wind Energy Evaluation with Urban Morphology," (vol. 101). London, UK: IntechOpen (Year: 2020).

* cited by examiner

INITIAL GRID FOR MODELING WIND AT TIME $t_0$

PREDICTED WIND VECTOR AT TIME $t_0$

DOWNSCALED GRID FOR MODELING WIND AT TIME $t_0$

PREDICTED WIND VECTOR AT TIME $t_0$ FOR EACH CELL
OF DOWNSCALED GRID

PREDICTED WIND VECTORS GENERATED AT TIME $t_0$ FOR EACH CELL OF DOWNSCALED GRID

ACTUAL OBSERVATIONS OF WIND AT TIME $t_0$

PREDICTED WIND VECTORS GENERATED AT TIMES $t_1$ - $t_k$
FOR EACH CELL OF DOWNSCALED GRID

SELECT TRAJECTORY FOR AERIAL VEHICLE BASED ON REPRESENTATION

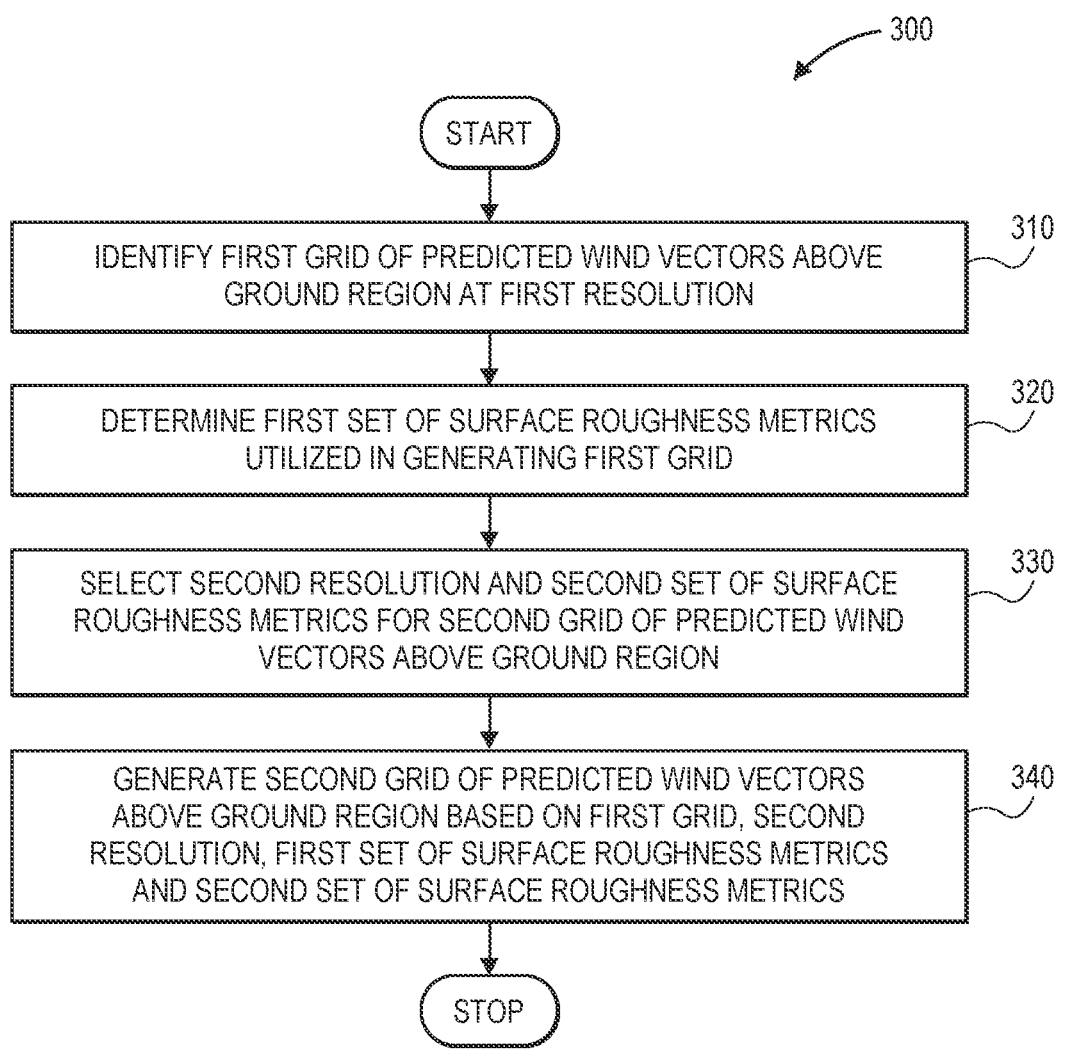

— 300

START

IDENTIFY FIRST GRID OF PREDICTED WIND VECTORS ABOVE
GROUND REGION AT FIRST RESOLUTION                                    310

DETERMINE FIRST SET OF SURFACE ROUGHNESS METRICS
UTILIZED IN GENERATING FIRST GRID                                    320

SELECT SECOND RESOLUTION AND SECOND SET OF SURFACE
ROUGHNESS METRICS FOR SECOND GRID OF PREDICTED WIND
VECTORS ABOVE GROUND REGION                                         330

GENERATE SECOND GRID OF PREDICTED WIND VECTORS
ABOVE GROUND REGION BASED ON FIRST GRID, SECOND
RESOLUTION, FIRST SET OF SURFACE ROUGHNESS METRICS
AND SECOND SET OF SURFACE ROUGHNESS METRICS        340

STOP

FIG. 3

IDENTIFY VECTORS OF CELLS OF FIRST GRID FOR USE IN
GENERATING VECTORS OF SECOND GRID

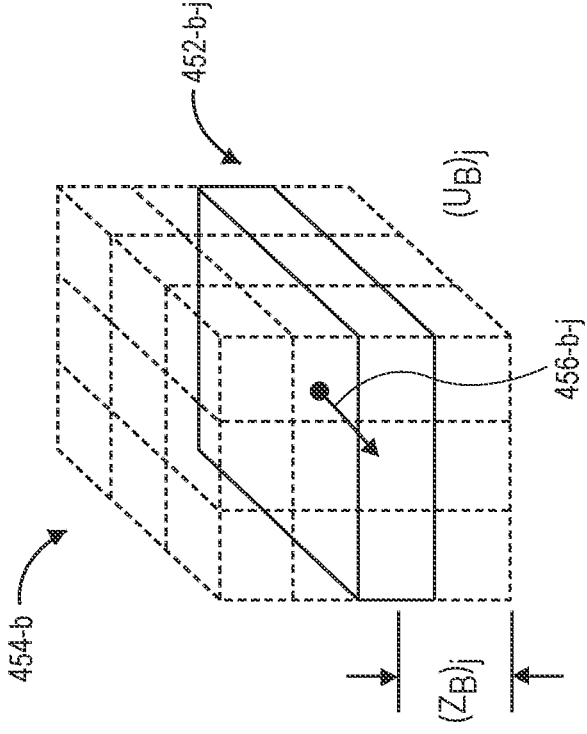
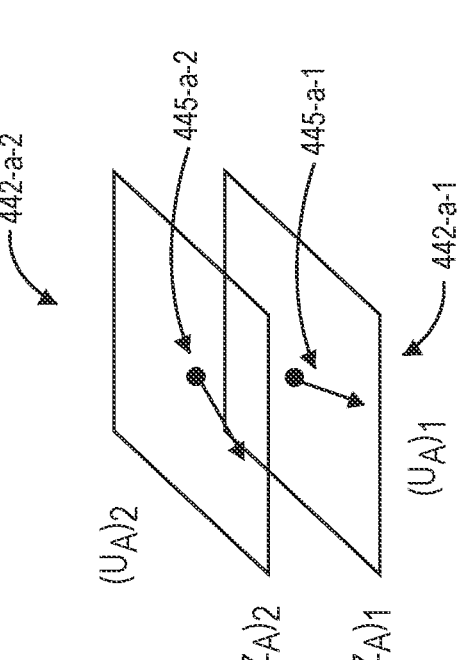
DETERMINE PREDICTED WIND VECTOR AT EACH ALTITUDE
DOWNSCALED GRID
FIG. 4C $$(u_B)i = (u_B)j \frac{ln\,((z_B)_j/(z_n)_i)}{ln\,((z_B)_j/(z_0)_j)}$$

TRANSFORM WIND VECTORS AT EACH ALTITUDE OF DOWNSCALED GRID
TO PREDICT WIND VECTOR FOR EACH CELL OF DOWNSCALED GRID

PREDICTED WIND VECTORS OVER GROUND REGION

OBSERVED WIND VECTORS OVER GROUND REGION $$X_a = X_b + K(y - H(X_b))$$

ASSIMILATE OBSERVED VECTORS INTO PREDICTED VECTORS

FORECASTING WIND CONDITIONS FOR OPERATIONS OF UNCREWED AERIAL VEHICLES

BACKGROUND

The safety and reliability of aerial vehicles (e.g., uncrewed aerial vehicles, unmanned aerial vehicles, or drones) that operate at low altitudes during the performance of one or more missions commonly depends on an accurate prediction of wind conditions within environments in which the aerial vehicles are intended to operate.

Unlike large-scale commercial aircraft, which operate at substantially high altitudes between takeoffs and landings, uncrewed aerial vehicles travel through chaotic and unpredictable layers of the atmosphere, e.g., a roughness sublayer, which is defined as a layer between a ground surface within a region and approximately five times a height of a highest obstacle or surface feature within the region. Due to variations in height, density or other parameters of natural and artificial surface features, wind conditions over one occupied or improved property (e.g., a dwelling having a lawn, a yard or other associated open space) may differ from wind conditions of another occupied or improved property, and wind conditions over each of such properties may also vary from minute to minute.

Wind velocities, or wind vector fields, may be predicted at various points in three-dimensional space using standard atmospheric models, such as the High-Resolution Rapid Refresh (or "HRRR") model of the United States National Oceanic & Atmospheric Administration, or the European Centre for Medium-Range Weather Forecasts (or "ECMWF") model. Most such models, however, produce general wind velocity predictions at fixed altitudes over large expanses of ground surfaces defined by grids at resolutions of multiple kilometers, and over extended periods of time. While atmospheric models such as HRRR or ECMWF are commonly used for large-scale forecasting, the models do not provide fine-grained resolution at lower altitudes where uncrewed aerial vehicles typically operate, and are not updated frequently enough to account for variations in weather during missions performed by such vehicles, which are usually brief in duration. Moreover, most atmospheric models do not incorporate real-world or real-time observations of wind conditions obtained from non-traditional sensors, such as sensors or other components provided aboard uncrewed aerial vehicles.

BRIEF DESCRIPTION OF THE DRAWINGS

FIGS. 1A through 1J are views of aspects of one system for forecasting wind conditions in accordance with implementations of the present disclosure.

FIG. 3 is a flow chart of one process for forecasting wind conditions in accordance with implementations of the present disclosure.

FIGS. 4A through 4E are views of aspects of one system for forecasting wind conditions in accordance with implementations of the present disclosure.

DETAILED DESCRIPTION

As is set forth in greater detail below, the present disclosure is directed to systems and methods for forecasting wind conditions. More specifically, the systems and methods of the present disclosure are directed to predicting wind vectors (e.g., spatially-distributed wind velocities, or spatially-distributed wind speeds and wind directions) above ground regions and at altitudes within three-dimensional ("3D") space in which uncrewed aerial vehicles typically operate with greater resolution, at greater frequency and with greater accuracy than traditional atmospheric models. In some implementations, the systems and methods of the present disclosure generate downscaled predictions of wind vectors over a ground region, and assimilate real-world observations of wind vectors at a given time into the predicted wind vectors at the same time. After assimilation, the predicted wind vectors, and other characteristics of weather and surface conditions, may then be provided as inputs to a machine learning model, such as a gradient-boosted decision trees algorithm, to generate a representation of wind vectors above the ground region over a period of time. The representation of wind vectors may then be relied upon to make one or more operational decisions regarding the operation of aerial vehicles over the ground region. For example, a representation of wind vectors may be relied upon in determining whether to authorize an aerial vehicle to conduct a mission over the ground region, in selecting a course, a speed or an altitude for an aerial vehicle over the ground region, or in estimating an amount of time or a duration of a mission performed by an aerial vehicle. Accurate representations of wind vectors generated in accordance with implementations of the present disclosure are particularly useful in forecasting wind conditions for uncrewed aerial vehicles, which are often sensitive to head winds or tail winds.

Figure 1A:
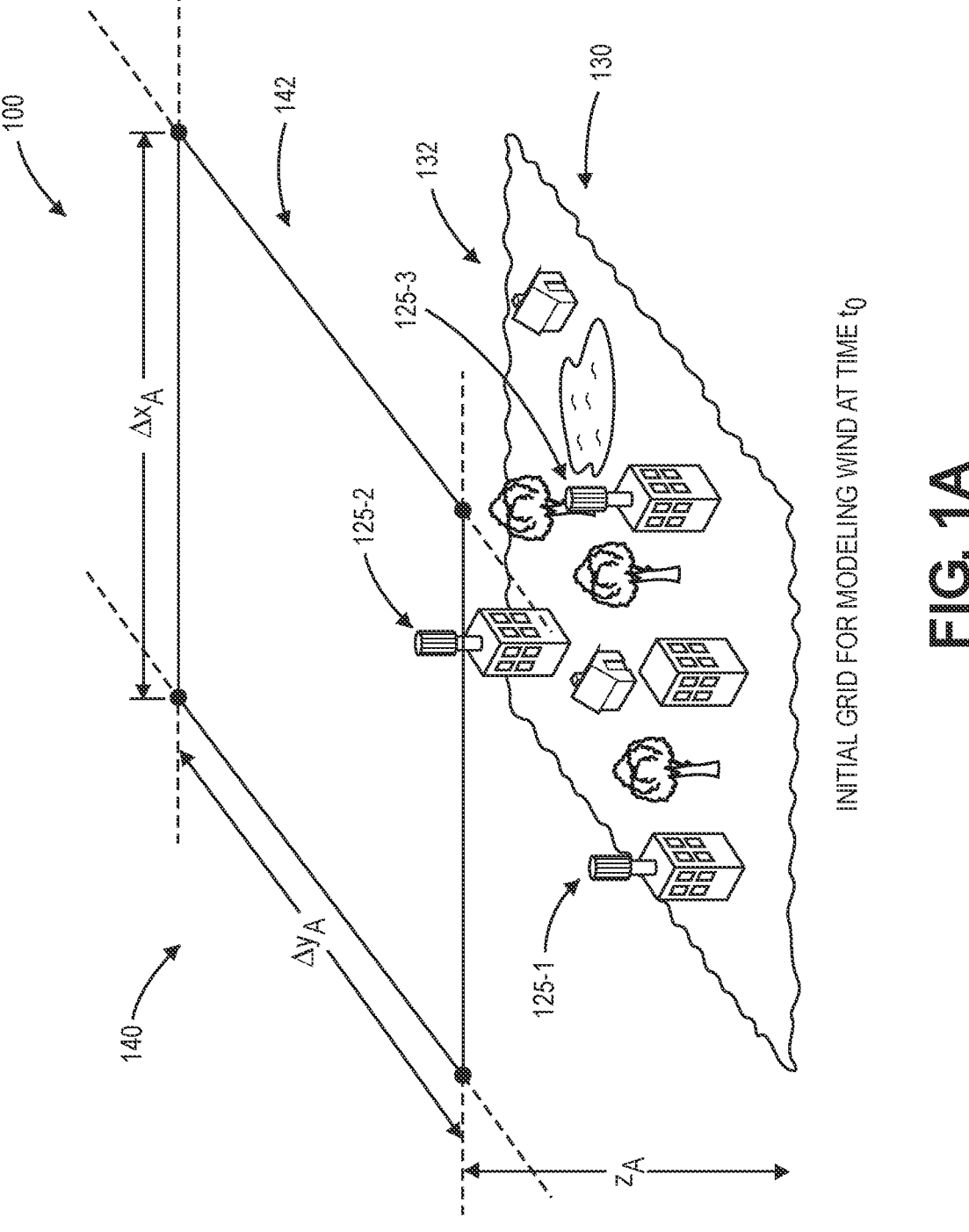

Referring to FIGS. 1A through 1J, views of aspects of one system for forecasting wind conditions in accordance with implementations of the present disclosure are shown. As is shown in FIG. 1A, an environment 100 (e.g., a region or space) in which the operation of an aerial vehicle is desired includes a ground region 130 having sections of land or water having any size or shape. Additionally, sections of land or water in the environment 100 may have any dimensions of any length. In some implementations, a section of land or water included in the environment 100 may have dimensions (e.g., lengths of sides, diameters or other dimensions) of approximately ten kilometers (or 10 km), twenty-five kilometers (or 25 km), fifty kilometers (or 50 km), or any other dimensions. Alternatively, the environment 100 may include sections of land or water having any dimensions of any other length.

The ground region 130 may include any type or form of natural features, such as landforms (e.g., canyons, hills, mountains, valleys, or others) or plant life (e.g., shrubs, trees, or any others). Additionally, the ground region 130 may further include any number of buildings, structures or other artificial surface features of any type or form. For example, the ground region 130 may include one or more agricultural buildings (e.g., barns, farmhouses, sheds, silos, or others), commercial buildings (e.g., automotive repair shops, cafes, car washes, convention centers, drugstores, eateries, gas stations, hotels, markets, offices, pharmacies, restaurants, shops, sports clubs, or others), educational buildings (e.g., colleges, dormitories, libraries, museums, schools, theaters or others), government buildings (e.g., city or town halls, courthouses, embassies, fire stations, police stations, post offices, or others), industrial buildings (e.g., factories, foundries, mills, power plants, warehouses or water towers), medical buildings (e.g., hospitals, nursing homes, or others), public forums (e.g., amusement parks, arenas, stadiums, theaters, or others), residential homes or other dwellings (e.g., single-family homes, apartment buildings, condominiums, dormitories, townhouses, or others), transportation centers or facilities (e.g., airports, bus stations, parking garages, terminals, train stations, or others), or any other structures.

The ground region 130 further includes a plurality of weather sensors 125-1, 125-2, 125-3 that are mounted, installed or fixed to natural or artificial features within the environment 100, or otherwise provided throughout the environment 100 in any other manner. For example, the weather sensors 125-1, 125-2, 125-3 may be mounted to tripods or other free-standing systems, atop buildings or other structures, such as utility systems (e.g., telephone poles). In some implementations, each of the weather sensors 125-1, 125-2, 125-3 may be mounted at a common altitude or height above one or more ground surfaces, e.g., at altitudes or heights of ten meters (or 10 m), and at horizontal buffers from other natural or artificial surface features, to ensure that wind flows sensed by such sensors are standardized and clean fetch in nature. Alternatively, one or more of the weather sensors 125-1, 125-2, 125-3 may be mounted at different altitudes or heights. Although the environment 100 shown in FIG. 1A includes three weather sensors 125-1, 125-2, 125-3, those of ordinary skill in the pertinent arts will recognize that the environment 100 may include any number or type of weather sensors in accordance with the present disclosure.

Each of the weather sensors 125-1, 125-2, 125-3 may include one or more sensing systems, e.g., anemometers (such as sonic anemometers), temperature and relative humidity probes, ceilometers, light detection and ranging systems, or others, as well as one or more processors, power sources, transceivers or other systems that enable the weather sensors 125-1, 125-2, 125-3 to capture information or data regarding wind flows or weather events or conditions occurring within vicinities of such sensors at a given time, and process the information or data, or transfer the information or data to one or more external devices or systems, e.g., over one or more networks, e.g., intermittently or continuously. Such information or data may identify one of the weather sensors 125-1, 125-2, 125-3 that captured the information or data, as well as a position of the weather sensor 125-1, 125-2, 125-3 that captured the information or data, which may be represented by a latitude and a longitude, or any other sets of coordinates according to any coordinate system. Such information or data may further include a speed of a wind flow, and a bearing or a direction from which the wind flow originated, as well as a time at which the wind flow was measured. The weather sensors 125-1, 125-2, 125-3 may be configured to capture and transmit information or data at any periodic interval, e.g., every one second, or at any other time and for any reason, such as upon detecting high-impact weather conditions. Such information or data may also include information regarding instantaneous velocities, filtered (e.g., rolling average) velocities, peak velocities or any other measurements or representations of wind speeds and wind directions, e.g., wind vectors, that are sensed by the weather sensors 125-1, 125-2, 125-3.

For example, in some implementations, the information or data may include raw data, which may be processed to determine steady wind speeds (e.g., average wind speeds) or gusts (e.g., peak wind speeds), as well as directions. In some other implementations, the information or data may include values of steady wind speeds or gusts calculated by one or more processors provided on the weather sensors 125-1, 125-2, 125-3.

As is further shown in FIG. 1A, a grid 140 includes a cell 142 (or one or more cells) defined with respect to a portion 132 of the ground region 130. The grid 140 has a level of resolution defined by dimensions $\Delta x_A$, $\Delta y_A$ of the cell 142 along an x-axis and a y-axis, respectively, which are provided in a single plane corresponding to an altitude $z_A$ above a ground level of the portion 132 of the ground region 130. Alternatively, the grid 140 may include multiple cells 142 (not shown) within the single plane corresponding to the altitude $z_A$. The dimensions $\Delta x_A$, $\Delta y_A$ of the cell 142 may have any length, and the cell 142 has a shape of rectangle. In some implementations, the cell 142 may have a shape of a square, and each of the dimensions $\Delta x_A$, $\Delta y_A$ may be approximately three kilometers.

Alternatively, the cell 142 may have any other shape, and either or both of the dimensions $\Delta x_A$, $\Delta y_A$ may have any other length. For example, the cell 142 may be three-dimensional in nature, and may have a shape of a cube. Furthermore, in some implementations, cells of the grid 140, such as the cell 142, may have a two-dimensional shape of a cylinder, or a three-dimensional shape of a cylinder. Moreover, in some implementations, the grid 140 may have multiple, heterogenous cells having uneven or varying shapes, which may be arbitrarily selected. Additionally, in some implementations, the altitude $z_A$ may be provided at ten meters above ground level (or "AGL"), eighty meters above ground level, one hundred meters above ground level, or at any other altitude above ground level. Moreover, in some implementations, the grid 140 may include additional cells 142 (not shown) within planes corresponding to altitudes other than the altitude $z_A$ above ground level.

Figure 1B:
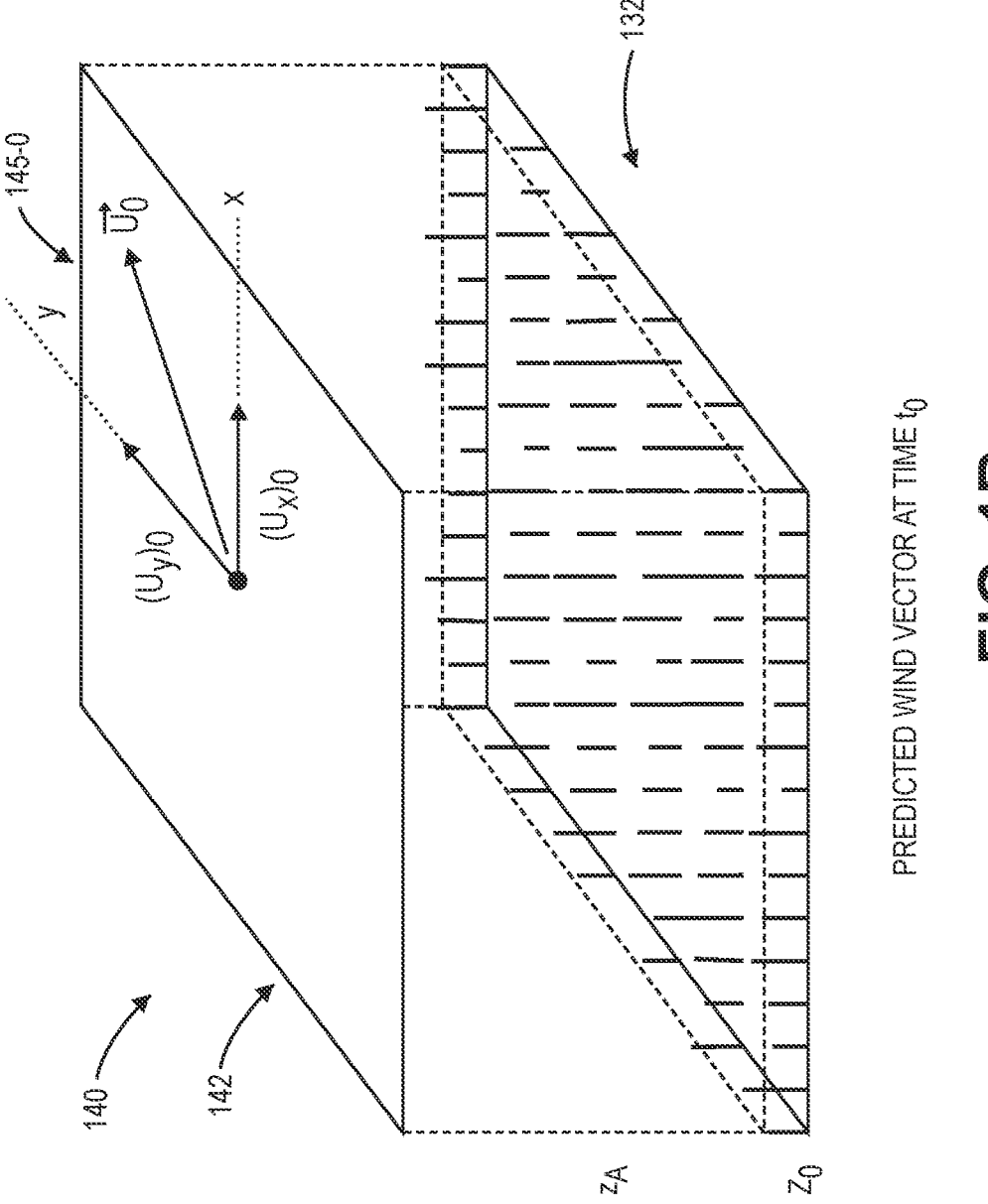

The grid 140 may be utilized to model wind vectors over the ground region 130 at an initial time $t_0$, e.g., according to a standard atmospheric model, such as the HRRR or the ECMWF. For example, as is shown in FIG. 1B, a predicted wind vector 145-0, or $u_0$, associated with the cell 142 of the grid 140 at the altitude $z_A$ above the portion 132 of the ground region 130 is calculated. The predicted wind vector 145-0 may be predicted as a scalar and a direction or, as is shown in FIG. 1B, as components $(u_x)_0$, $(u_y)_0$ along the x-axis and the y-axis, respectively, from which both a value and a direction of the predicted wind vector 145-0 may be derived.

The predicted wind vector 145-0 may be calculated based on any number of factors, including but not limited to a roughness of a surface of the portion 132 of the ground region 130, which may be represented by a standard or a metric such as an aerodynamic surface roughness length $z_0$, as well as atmospheric or other environmental variables such as precipitation, humidity, atmospheric stability, cloud cover, solar radiation, or any other factors.

The surface roughness length $z_0$ of the portion 132 of the ground region 130 may be calculated on any basis and according to any technique. For example, the surface roughness length $z_0$ may be calculated according to one or more morphometric models based on a planar area occupied by buildings, structures or other objects in the portion 132 of the ground region 130 divided by a total horizontal area of the portion 132 of the ground region 130, or a total frontal area of buildings, structures or other objects facing wind in the portion 132 of the ground region 130 divided by an overall horizontal area of the portion 132 of the ground region 130. Each portion of the ground region 130 may have a different surface roughness length, to the extent that the natural or artificial features of such portions are different, and the different surface roughness lengths may affect the predicted wind flows above each of such portions.

Figure 1C:
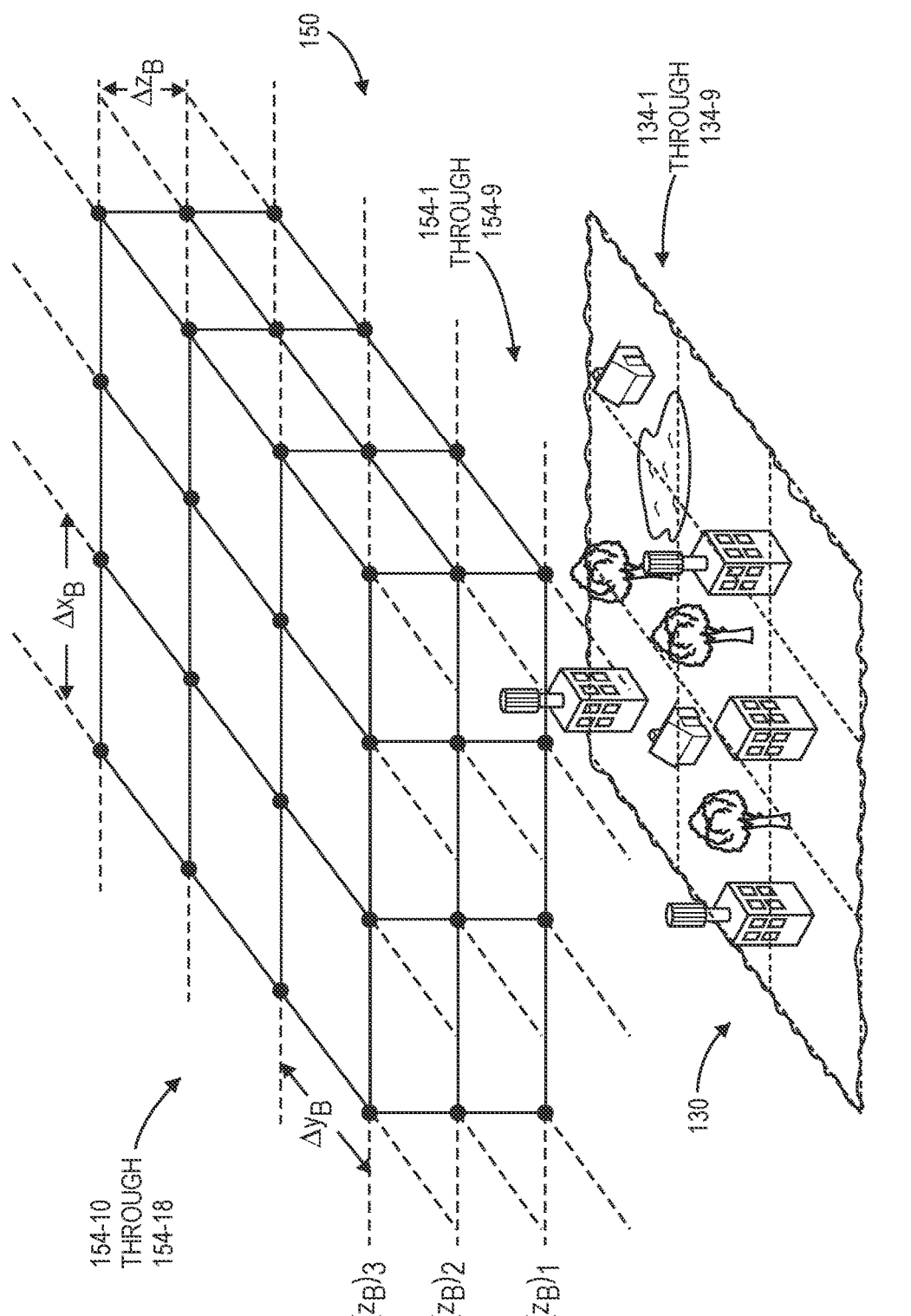

In accordance with implementations of the present disclosure, predictions of wind vectors may be refined or enhanced by downscaling grids or other definitions of points in 3D space for which the wind vectors are predicted to a higher level of resolution, and for transforming wind vectors predicted for the grids at a lower level of resolution to derive wind vectors for the grids at the higher level of resolution. As is shown in FIG. 1C, a downscaled grid 150 includes a plurality of cells 154-1 through 154-9, 154-10 through 154-18 with respect to portions 134-1 through 134-9 of the ground region 130. The grid 150 has a level of resolution defined by dimensions $\Delta x_B$, $\Delta y_B$ of the cells 154-1 through 154-9, 154-10 through 154-18 along or parallel to the x-axis and the y-axis, respectively, and a dimension $\Delta z_B$ along or parallel to the z-axis. Additionally, as is further shown in FIG. 1C, the grid 150 includes a pair of layers of the cells 154-1 through 154-9, 154-10 through 154-18 provided above corresponding portions 134-1 through 134-9 of the ground region 130. A first layer of the cells 154-1 through 154-9 is provided between an altitude $(z_B)_1$ above the ground region 130 and an altitude $(z_B)_2$ above the ground region 130, while a second layer of the cells 154-10 through 154-18 is provided above the first layer of the cells, between the altitude $(z_B)_2$ and an altitude $(z_B)_3$ above the ground region 130. As is also shown in FIG. 1C, the altitude $(z_B)_1$ and the altitude $(z_B)_2$, and the altitude $(z_B)_2$ and the altitude $(z_B)_3$, are each separated by the dimension $\Delta z_B$.

The dimensions $\Delta x_B$, $\Delta y_B$ of the representative cell 154-i are less than the corresponding dimensions $\Delta x_A$, $\Delta y_A$ of the cell 142 of the ground surface 130, thereby ensuring that a set of predicted wind vectors calculated based for the downscaled grid 150 has greater resolution than the predicted wind vector 145-0 calculated for the grid 140. The dimensions $\Delta x_B$, $\Delta y_B$ of the cell 142 may have any lengths that are smaller than the dimensions $\Delta x_A$, $\Delta y_A$ of the cell 154-i, e.g., by a factor or multiple of the dimensions $\Delta x_A$, $\Delta y_A$. For example, in some implementations, such as where the dimensions $\Delta x_A$, $\Delta y_A$ of the cell 142 are approximately three kilometers, each of the dimensions $\Delta x_B$, $\Delta y_B$ of the cell 154-i may be approximately one kilometer. Alternatively, either or both of the dimensions $\Delta x_A$, $\Delta y_A$ of the cell 142 may have any other length.

Figure 1D:
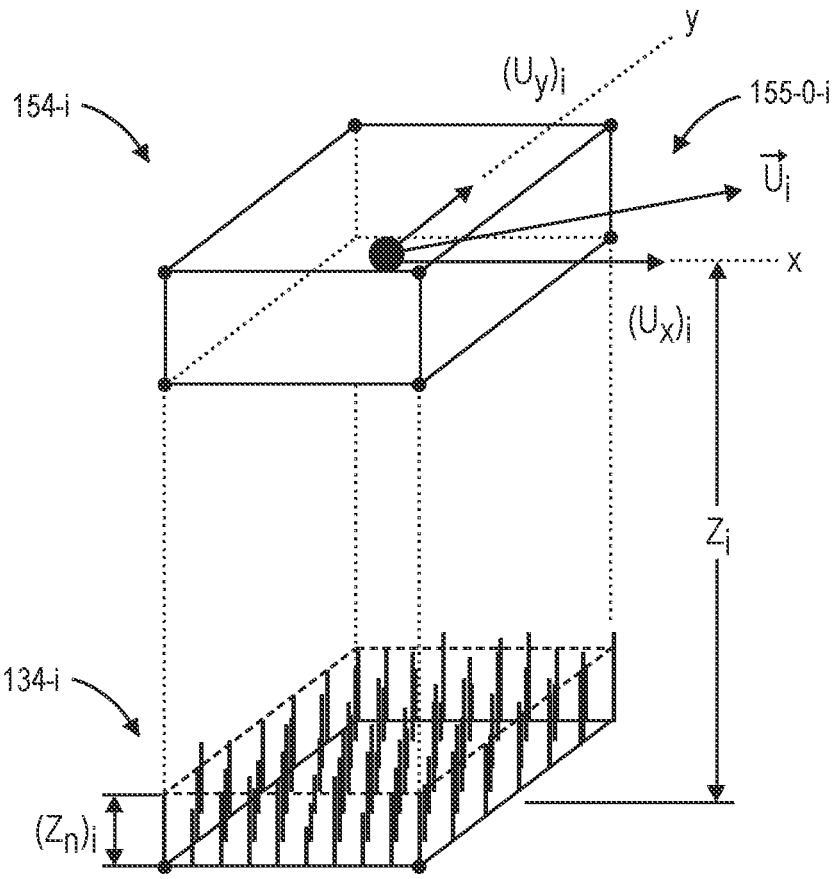

The grid 150 may be utilized to model wind vectors over the portions 134-1 through 134-9 of the ground region 130 at the initial time $t_0$, based on the wind vector $u_0$ generated for the portion 132 of the ground region 130 as a whole. For example, as is shown in FIG. 1D, a wind vector 155-0-i, or $u_i$, associated with a representative one of the cells 154-i of the grid 150, which includes or represents a three-dimensional space above a representative portion 134-i of one of the portions 134-1 through 134-9 of the ground region 130, may be calculated. In some implementations, the wind vector 155-0-i may be calculated based on the wind vector 145-0 of FIG. 1B that was predicted for the portion 132 of the ground region 130, of which the representative portion 134-i is a part, as well as an altitude $z_i$ of the representative cell 154-i, the surface roughness length $z_0$ for the portion 132, and the surface roughness length $(z_0)_i$ of the representative portion 134-i. The predicted wind vector 155-0-i may be calculated as a scalar and a direction or, as is shown in FIG. 1D, as components $(u_x)_i$, $(u_y)_i$ along the x-axis and the y-axis, respectively, from which both a value and a direction of the wind vector 155-0-i may be derived.

Figure 1E:
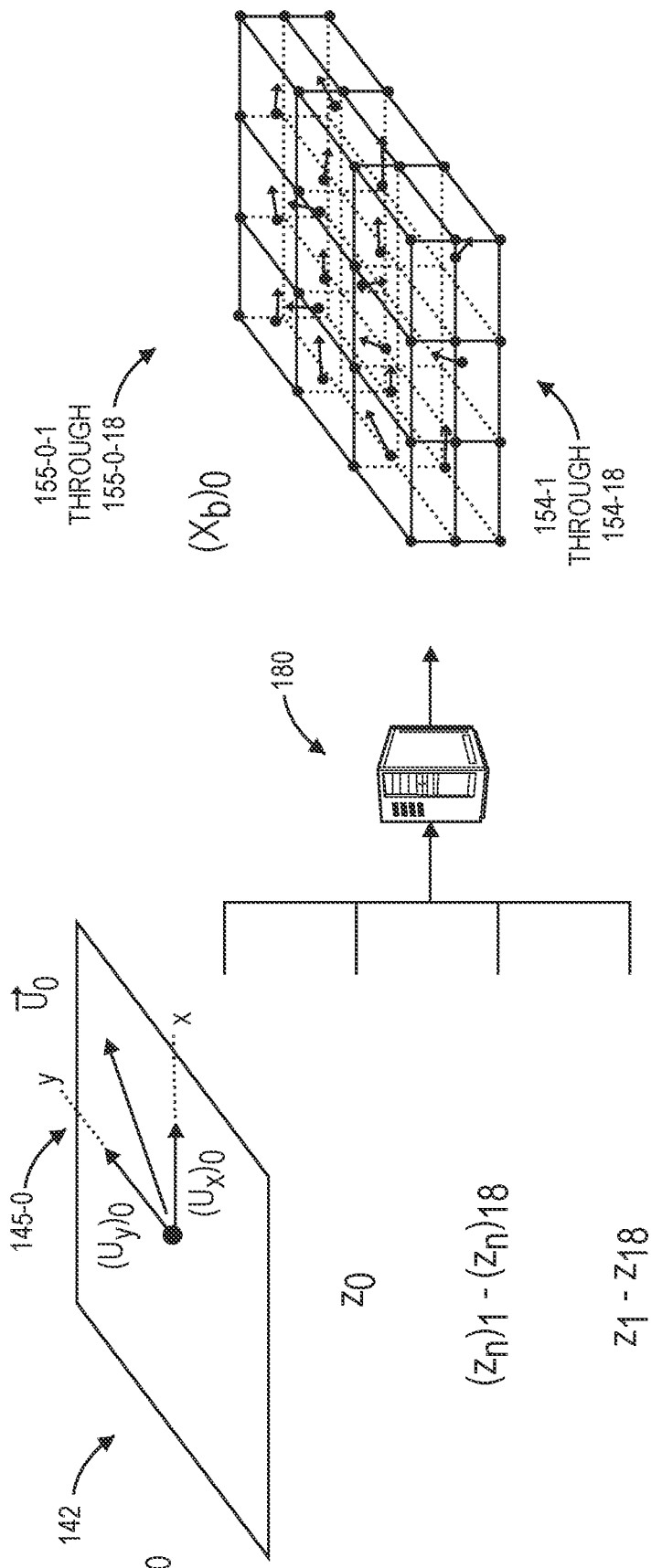

Predicted wind vectors may be calculated for each of a plurality of cells 154-1 through 154-9, 154-10 through 154-18 of the grid 150 in the same manner as the predicted wind vector 150-0-i shown in FIG. 1D. For example, as is shown in FIG. 1E, a background set of predicted wind vectors 155-0-1 through 155-0-18 at time $t_0$, or $(X_b)_0$, are calculated for the cells 154-1 through 154-9, 154-10 through 154-18 based on the wind vector 145-0 calculated for the cell 142, as well as the surface roughness length $z_0$ of the portion 132 of the ground region 130, the surface roughness lengths $(z_n)_1$ through $(z_n)_{18}$ of the respective portions 134-1 through 134-9 of the ground region 130, and the altitudes $z_1$ through $z_{18}$ of the respective cells 154-1 through 154-9, 154-10 through 154-18 above the ground surface 130.

The background set of predicted wind vectors 155-0-1 through 155-0-18 at time $t_0$ may be calculated in any manner. In some implementations, each of the predicted wind vectors of the set may be calculated according to a transformation, e.g., a log transformation, or any other transformation. In some implementations, a predicted wind vector for a smaller cell may be calculated as a product of a predicted wind vector calculated for a larger cell and a natural log of a ratio of an altitude of the smaller cell to a surface roughness length of a portion of a ground surface beneath that smaller cell, divided by a natural log of a ratio of the altitude of the smaller cell to a surface roughness length of a portion of the ground surface beneath the larger cell as a whole. For example, referring again to FIGS. 1B and 1D, the representative vector 155-0-i may be calculated for the representative cell 154-i over the representative portion 134-i of the ground surface 130 at time $t_0$ by multiplying the predicted wind vector 145-0 for the portion 132 of the ground surface 130, or $u_0$, by a natural log of a ratio between the altitude $z_i$ of the representative cell 154-i.

Alternatively, where the grid 140 includes predicted wind vectors at two or more cells 142 provided at different altitudes, such as ten meters and eighty meters by the HRRR model, or ten meters and one hundred meters by the ECMWF model, each of the predicted wind vectors of the set may be calculated by interpolating the two or more predicted wind vectors to calculate a wind vector at altitudes of each of the cells 154-1 through 154-9, 154-10 through 154-18, and transforming the wind vectors at such altitudes to account for differences in surface roughness of portions of the ground region 130 below the individual cells 154-1 through 154-9, 154-10 through 154-18 and the portion 132 of the ground region 130 below the cells 142 as a whole.

Figure 1F:
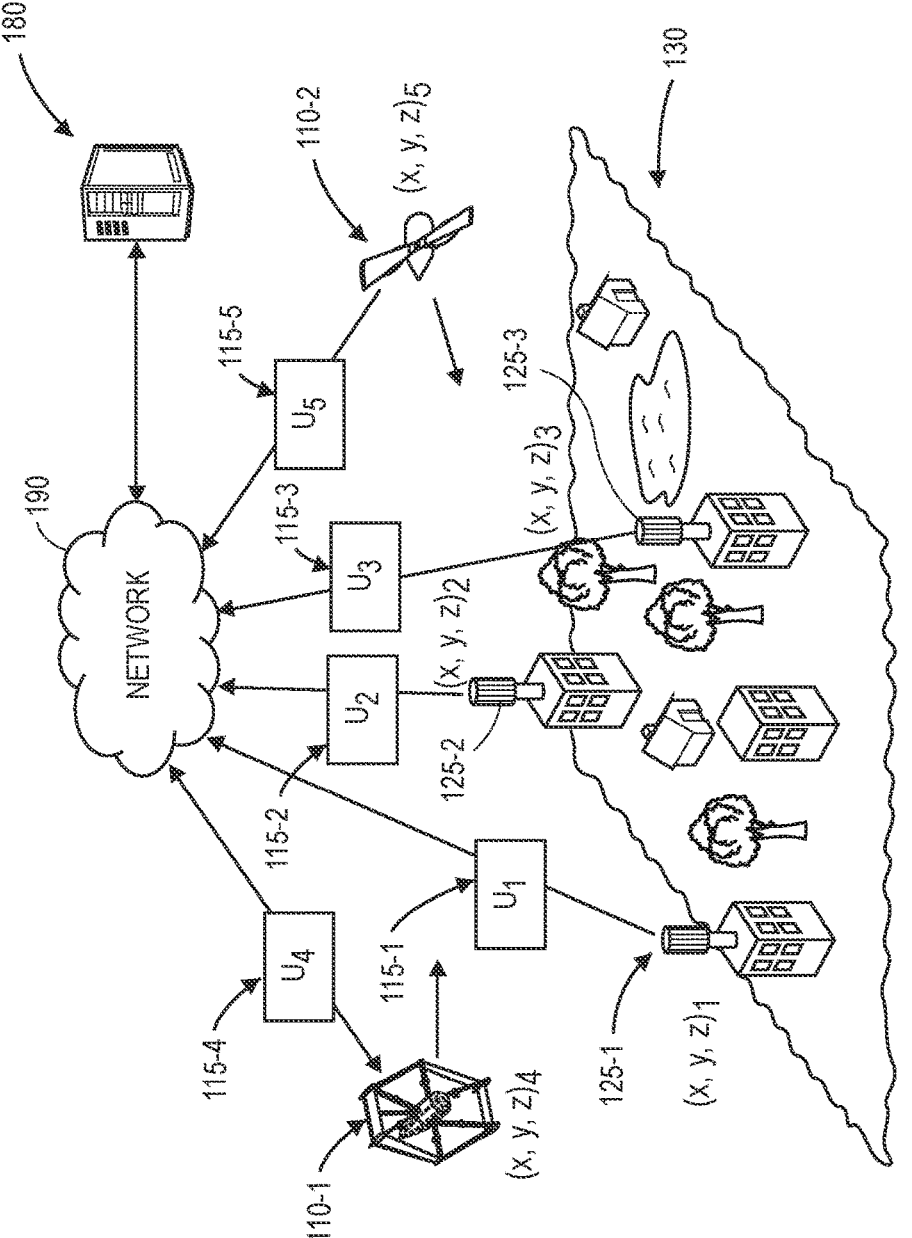

Predicted wind vectors over ground regions that are calculated in accordance with implementations of the present disclosure may be assimilated with actual wind observations obtained from systems or components of any type or form that are mounted to structures within the ground regions, such as one or more ground-based weather sensors, or provided aloft over the ground regions, such as one or more aerial vehicles. As is shown in FIG. 1F, the weather sensors 125-1, 125-2, 125-3 transmit sets of data 115-1, 115-2, 115-3 indicating vectors $u_1$, $u_2$, $u_3$ of wind observed by the respective weather sensors 125-1, 125-2, 125-3 at the time $t_0$ to a server 180 (or another external computer system) over one or more networks 190. Additionally, as is further shown in FIG. 1F, a pair of aerial vehicles (e.g., uncrewed aerial vehicles) 110-1, 110-2 operating near or over the ground region 130 also transmit sets of data 115-4, 115-5 indicating vectors $u_4$, $u_5$ of wind observed by the respective aerial vehicles 110-1, 110-2 at the time $t_0$ to the server 180 over the one or more networks 190. In some implementations, the vectors $u_4$, $u_5$ may be determined using one or more weather sensors (e.g., anemometers) provided aboard the aerial vehicles 110-1, 110-2, which may capture data and estimate or infer wind flows at locations where the data was captured. Alternatively, in some other implementations, the vectors $u_4$, $u_5$ may be determined by interpreting control signals that are generated and executed by the aerial vehicles 110-1, 110-2 in order to remain on a selected course, at a selected speed, or at a selected altitude. Such signals may be processed to estimate or infer wind flows at locations where the control signals were generated or executed.

Each of the sets of data 115-1, 115-2, 115-3, 115-4, 115-5 may include identifiers of positions $(x, y, z)_1$, $(x, y, z)_2$, $(x, y, z)_3$ of the respective sensors 125-1, 125-2, 125-3 or positions $(x, y, z)_4$, $(x, y, z)_5$ of the respective aerial vehicles 110-1, 110-2 at the time $t_0$, represented by a latitude and a longitude, or any other sets of coordinates, as well as a speed or a velocity of wind at such positions, a bearing from which the wind originated, a time stamp or other identifier of the time $t_0$, or any other information or data regarding the wind flows, prevailing weather conditions, or other factors. The sets of data 115-1, 115-2, 115-3, 115-4, 115-5 may include wind flows represented as a scalar and a direction, as components along the x-axis and the y-axis, or in any other manner. Moreover, speeds or velocities of wind flow may be represented as instantaneous velocities, average (e.g., rolling average) velocities, peak velocities or any other measurements or representations of velocities of winds, as well as steady wind speeds or gusts (e.g., peak wind speeds). The weather sensors 125-1, 125-2, 125-3 or the aerial vehicles 110-1, 110-2 may transmit the sets of data 115-1, 115-2, 115-3, 115-4, 115-5 continuously or at any other intervals of time.

Figure 1G:
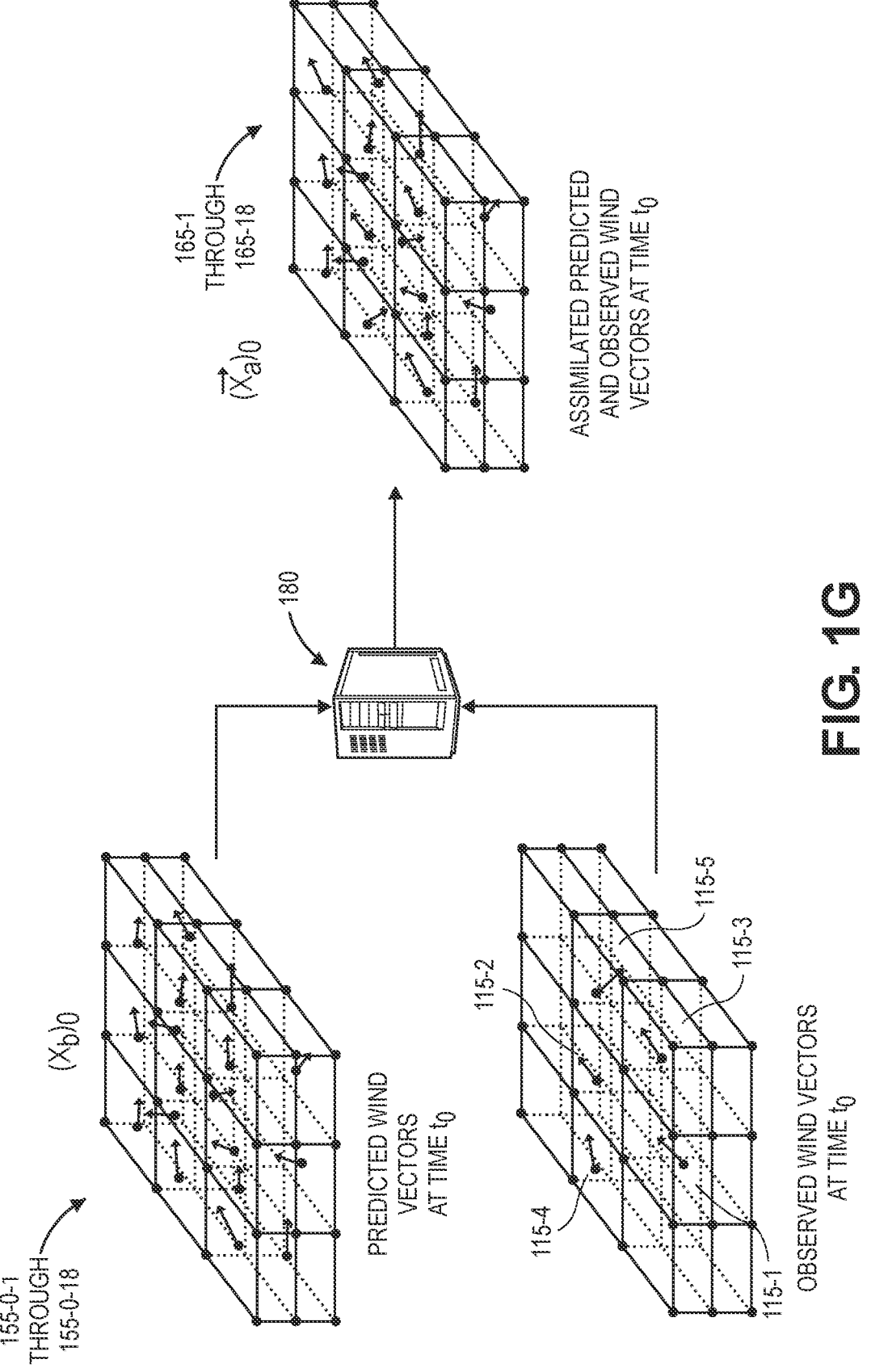

In accordance with implementations of the present disclosure, wind vectors observed at points above a ground region at a given time may be assimilated with wind vectors that are predicted at points above the ground region for the given time. As is shown in FIG. 1G, the background set of predicted wind vectors 155-0-1 through 155-0-18 at time $t_0$, or $(X_b)_0$, are assimilated with the sets of data 115-1, 115-2, 115-3, 115-4, 115-5 representing a set of the wind vectors $u_1$, $u_2$, $u_3$, $u_4$, $u_5$ observed at time $t_0$, or y, by the server 180. For example, the background set of predicted wind vectors 155-0-1 through 155-0-18 and the sets of data 115-1, 115-2, 115-3, 115-4, 115-5 representing the wind vectors $u_1$, $u_2$, $u_3$, $u_4$, $u_5$ observed at time $t_0$ may be assimilated to form a corrected set of wind vectors 165-0-1 through 165-0-18 at time $t_0$, or $(X_a)_0$, by optimal interpolation, variational data assimilation (e.g., three-dimensional variational data assimilation or four-dimensional variational data assimilation), or by any other technique.

In some implementations, an optimal interpolation may be performed by calculating a sum of the background set of predicted wind vectors at time $t_0$, or $(X_b)_0$, and a product of a Kalman gain weighting matrix and a difference between the set of the wind vectors $u_1$, $u_2$, $u_3$, $u_4$, $u_5$ observed at time $t_0$, or y, and the wind vectors of the background set at the positions $(x, y, z)_1$, $(x, y, z)_2$, $(x, y, z)_3$, $(x, y, z)_4$, $(x, y, z)_5$ at which the wind vectors $u_1$, $u_2$, $u_3$, $u_4$, $u_5$ were observed. A Kalman gain weighting matrix utilized in an optimal interpolation may be defined as a product of a background field error covariance matrix, a linear transformation matrix and a diagonal observation matrix, such that the Kalman gain weighting matrix is calculated as the background error covariance in the observation space multiplied by a total error covariance. For example, in some implementations, the background field error covariance matrix may be calculated as a product of a diagonal matrix of a background error standard deviation and a correlation coefficient matrix of a common size.

Alternatively, an optimal interpolation, a variational data assimilation, or any other data assimilation may be performed in any other manner.

Figure 1H:
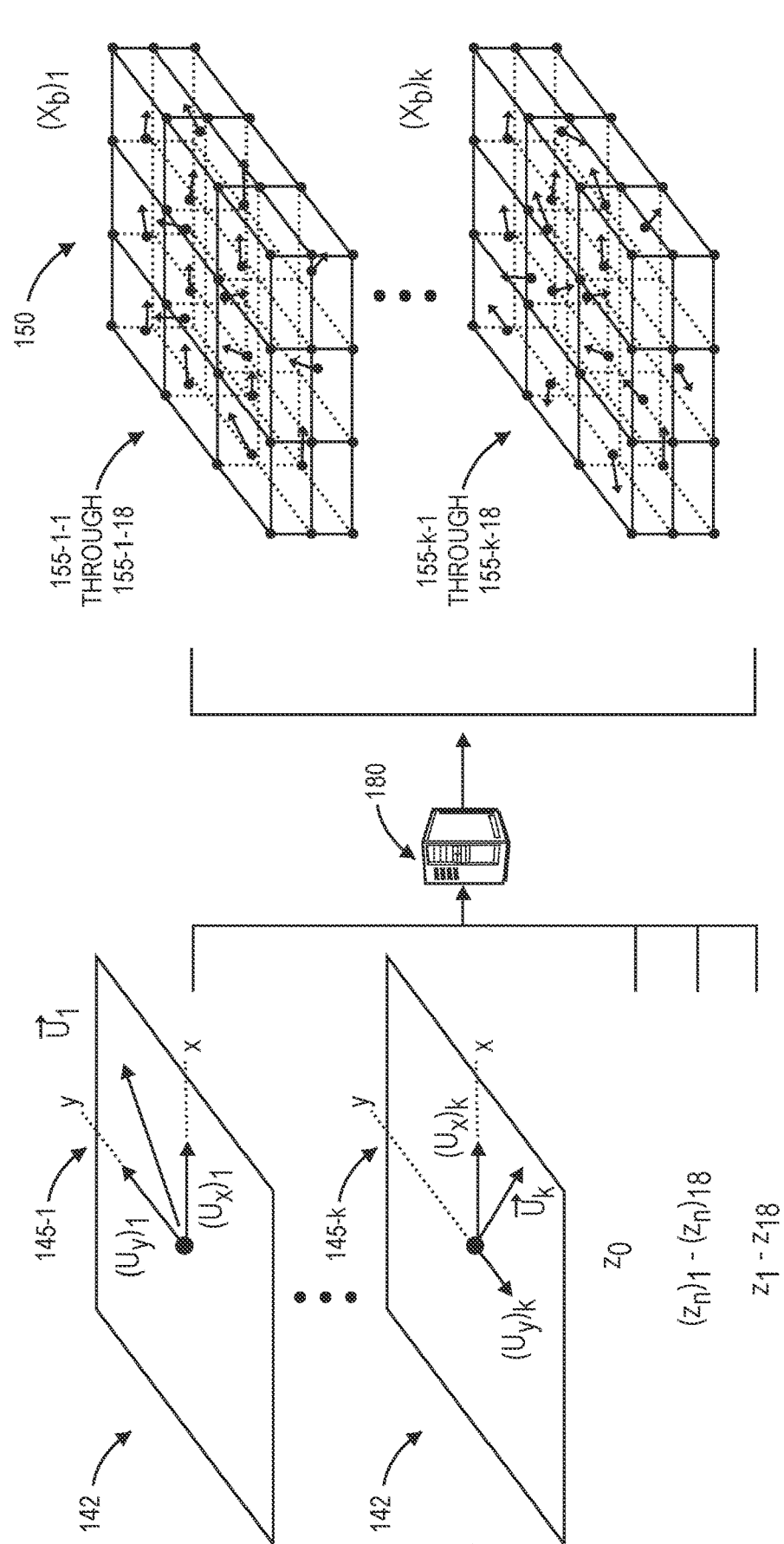
Figure 11:
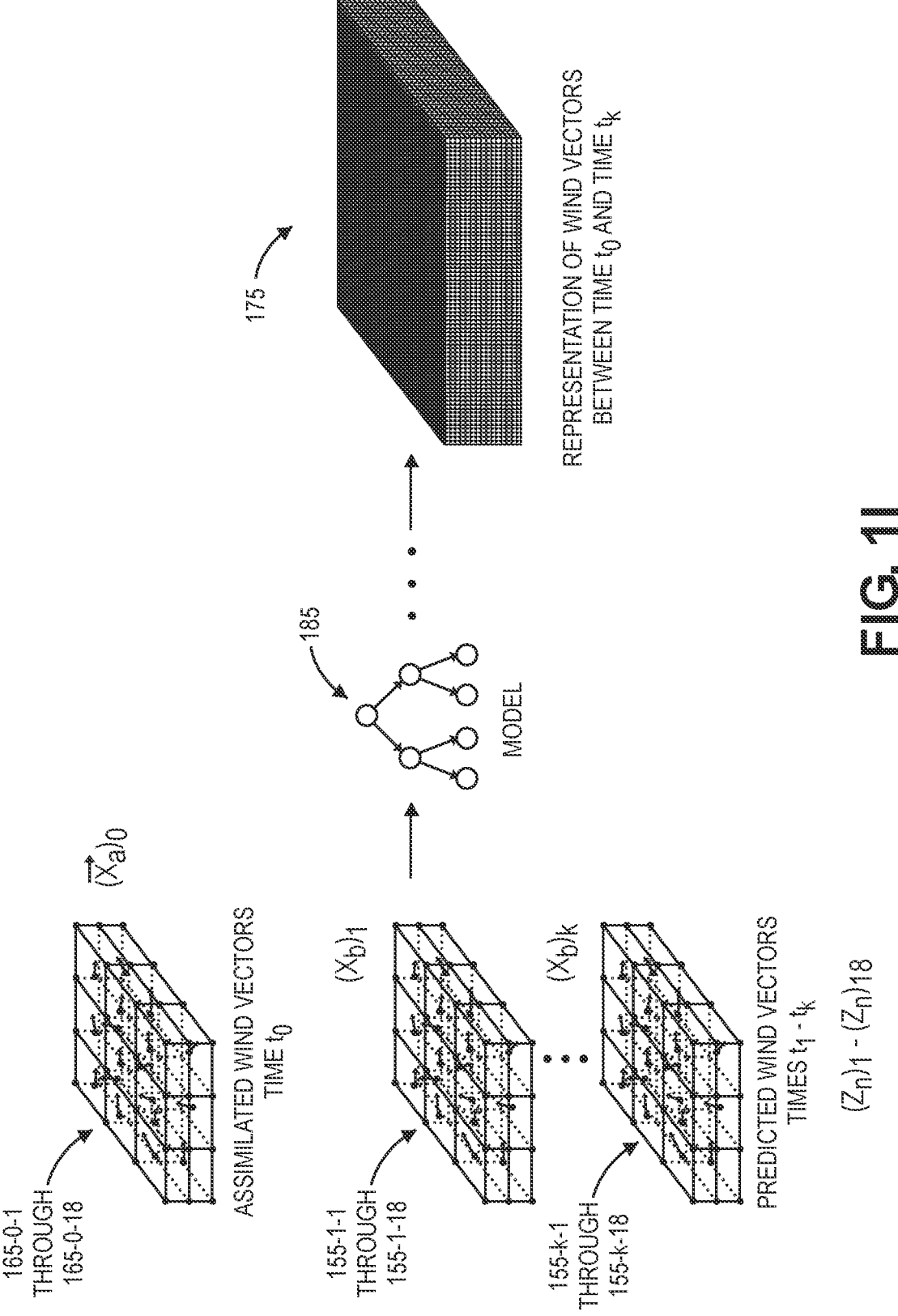

A set of wind vectors defined by assimilating predicted wind vectors with observed wind vectors at a given time may be utilized along with predicted wind vectors generated at future times. As is shown in FIG. 1H, background sets of predicted wind vectors 155-1-1 through 155-1-18 . . . 155-$k$-1 through 155-$k$-18 for cells of the downscaled grid 150 over the portions 134-1 through 134-9 of the ground region 130 at times $t_1$ through $t_k$, or $(X_b)_1$ through $(X_b)_k$, are generated by the server 180 based on predicted wind vectors 145-1 . . . 145-$k$ calculated for the cell 142 of the grid 140, as well as the surface roughness length $z_0$ of the portion 132 of the ground surface 130, the surface roughness lengths $(z_n)_1$ . . . $(z_n)_{18}$ of the portions 134-1 through 134-9 of the ground region 130, and the altitudes $z_1$ . . . $z_{18}$ of the respective cells of the downscale grid 150 above the ground region 130. The background sets of predicted wind vectors 155-1-1 through 155-1-18 . . . 155-$k$-1 through 155-$k$-18 may be calculated in a manner similar to that described above with respect to the background set of predicted wind vectors 155-0-1 through 155-0-18 at time $t_0$, or $(X_b)_0$, in FIGS. 1D and 1E.

In accordance with implementations of the present disclosure, a representation of wind fields above a ground region over a period of time may be generated based on assimilated wind vectors for cells of a grid above the ground region at a current time, as well as predicted wind vectors for the cells of the grid at later intervals over the period of time. As is shown in FIG. 1I, the set of wind vectors 165-0-1 through 165-0-18 at time $t_0$, or $(X_a)_0$, generated as is shown in FIG. 1G and the background sets of predicted wind vectors 155-1-1 through 155-1-18, 155-$k$-1 through 155-$k$-18 for cells of the downscaled grid 150 over the portions 134-1 through 134-9 of the ground region 130 at times $t_1$ through $t_k$, or $(X_b)_1$ through $(X_b)_k$, generated as shown in FIG. 1H, are provided as inputs to a machine learning model 185, which may include a decision trees algorithm, e.g., a gradient-boosted decision trees algorithm, or any other machine learning algorithm, system or technique. A representation 175 of wind vectors over a period of time between the time $t_0$ and the time $t_k$ may be generated based at least in part on outputs received from the machine learning model 185 in response to the inputs.

The representation 175 of wind vectors may represent wind fields at each location within a space occupied by the grid 150 over the ground region 130, as shown in FIG. 1C, at any level of resolution and over the period of time between the time $t_0$ and the time $t_k$. In some implementations, the representation 175 may be a four-dimensional grid having the dimensions and level of resolution of the grid 150, or a greater level of resolution, as well as a time dimension over the period of time. For example, in some implementations, the representation 175 may have a length of twenty-five kilometers, a width of twenty-five kilometers and a height of one hundred twenty meters, and represent predicted wind vectors at one-minute intervals for ninety minutes into the future for individual cells having any size or dimension. Alternatively, the representation 175 may include predicted wind velocities over spaces having any other dimensions, and over any other periods of time. Moreover, the representation 175 may also include predicted average wind speeds (e.g., a steady wind speed), predicted gust speeds, directions associated with the wind speeds, anticipated air temperatures, precipitation, visibility, cloud coverage, altitudes, weather conditions (e.g., lightning), or any other relevant information or data.

Figure 1J:
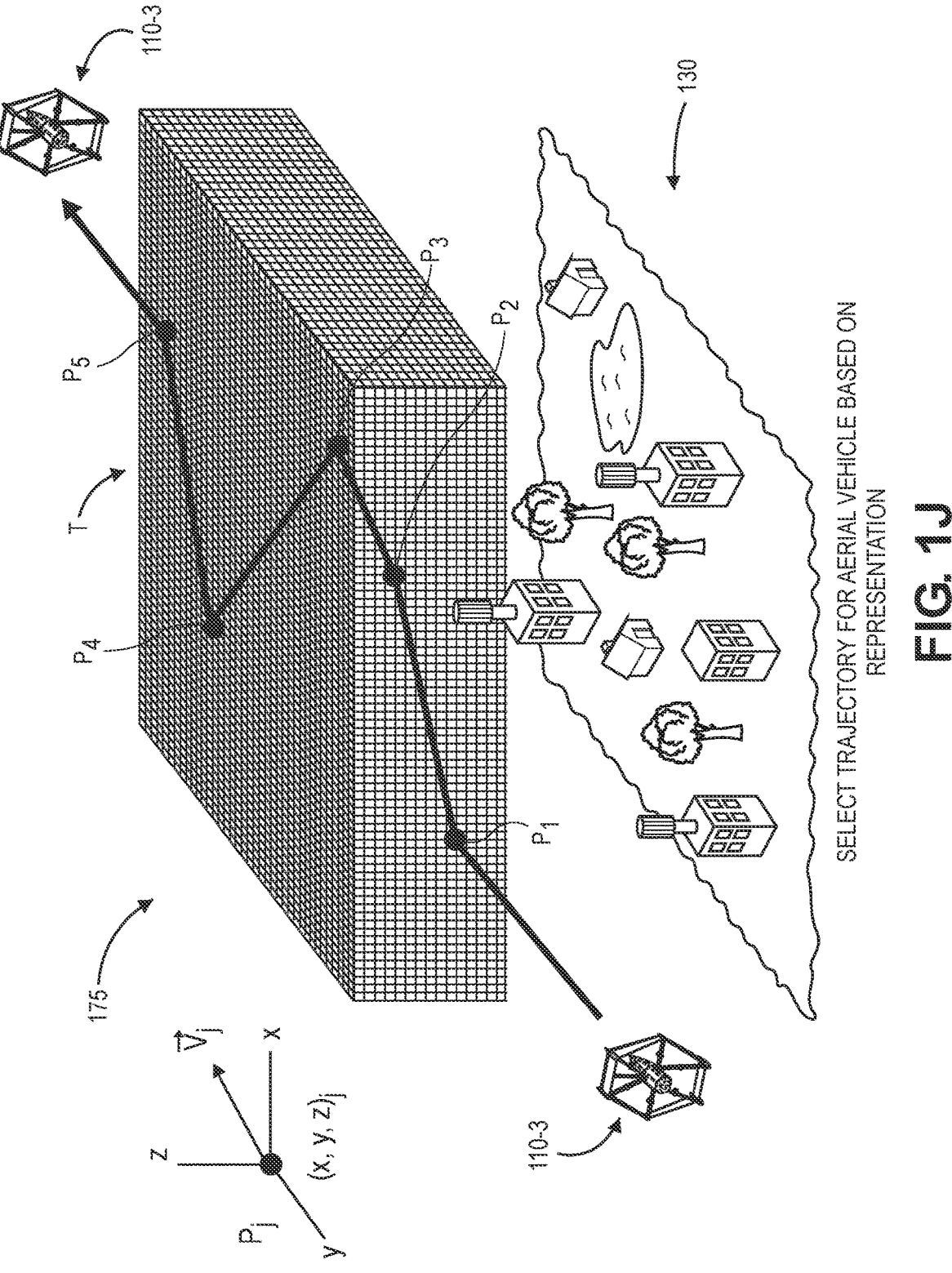

Once the representation 175 has been generated, the representation 175 may be utilized in making any operational decision for one or more aerial vehicles (e.g., uncrewed aerial vehicles) operating over the ground region 130. As is shown in FIG. 1J, a trajectory T for an aerial vehicle 110-3 during the performance of one or more missions over the ground region 130 is selected based at least in part on the representation 175. For example, using the representation 175, a plurality of points $P_1$, $P_2$, $P_3$, $P_4$, $P_5$ in three-dimensional space through which the aerial vehicle 110-3 is to travel may be selected for any reason, e.g., to avoid head winds, to exploit tail winds, to avoid regions of high wind shear or high wind gusts, to minimize power consumption, or for any other reason. Moreover, for each point $P_j$ of the points $P_1$, $P_2$, $P_3$, $P_4$, $P_5$, a position $(x, y, z)_j$ and a velocity $V_j$ of the aerial vehicle 110-3 at such points, as well as any courses, speeds or altitudes for traveling between such points, may be selected based on the representation 175.

Alternatively, the representation 175 may be utilized to make any other operational decision regarding operations over the ground region 130. For example, where any of a plurality of aerial vehicles are available to perform a mission over the ground region 130, one of the aerial vehicles, viz., the aerial vehicle 110-3, may be selected based on attributes of the respective aerial vehicles and the predicted wind flows as represented in the representation 175. Additionally, whether the aerial vehicle 110-3 is authorized to perform a mission or whether the mission should be canceled, may be determined based on the representation 175. Likewise, a time required for the aerial vehicle 110-3 to perform a mission, as well as a time of departure or an estimated time of arrival, may be selected or estimated based on attributes of the aerial vehicle 110-3 and the predicted wind flows as represented in the representation 175.

The surface roughness length $z_0$ of the portion 132 of the ground region 130 may be calculated on any basis and according to any technique. For example, the surface roughness length $z_0$ may be calculated according to one or more morphometric models based on a planar area occupied by buildings, structures or other objects in the portion 132 of the ground region 130 divided by a total horizontal area of the portion 132 of the ground region 130, or a total frontal area of buildings, structures or other objects facing wind in the portion 132 of the ground region 130 divided by an overall horizontal area of the portion 132 of the ground region 130

Estimates of surface roughness of ground regions are significant contributors to models of atmospheric processes or effects, such as wind flows, over the ground regions. Land topography, or a configuration of a ground region including relief or positions of natural or man-made objects, is typically characterized in terms of roughness elements or land-use categories, e.g., terms such as "agriculture," "hills," "village," "city," or others that describe physical characteristics or human uses of a ground region. Surface roughness is commonly represented by a surface roughness metric such as a "surface roughness length," or an "aerodynamic roughness length," or $z_0$, which may be calculated on any basis and according to any technique. Roughness of a surface affects an area-aggregate drag that the surface exerts on the atmosphere and may depend on a total frontal or planar area of roughness elements, e.g., buildings, trees, reliefs, or other features, divided by a horizontal area occupied by such elements. Alternatively, roughness may depend on area-evaluated building height statistics for a ground region (e.g. a mean building height of the ground region). For example, according to some standards, substantially flat surfaces such as plains, seas, paved areas or flat deserts may have roughness lengths of approximately 0.0002, while smooth beaches, ice or snow-covered fields may have roughness lengths of approximately 0.005, and open fields, prairies or tundra may have roughness lengths of approximately 0.03. Likewise, cultivated areas of low crops or bushes may have roughness lengths of approximately 0.1, while high crop areas with scattered obstacles such as trees may have roughness lengths of approximately 0.25, and mixed farm fields and forest clumps, orchards or buildings may have roughness lengths of approximately 0.5. Areas of large obstacles and open spaces such as suburban neighborhoods, villages or forests may have roughness lengths of approximately 1.0, and centers of large towns or cities may have roughness lengths of approximately 2.0 or more. Alternatively, surface roughness metrics may be calculated or estimated on any other basis, and according to any other standard.

Figure 2:
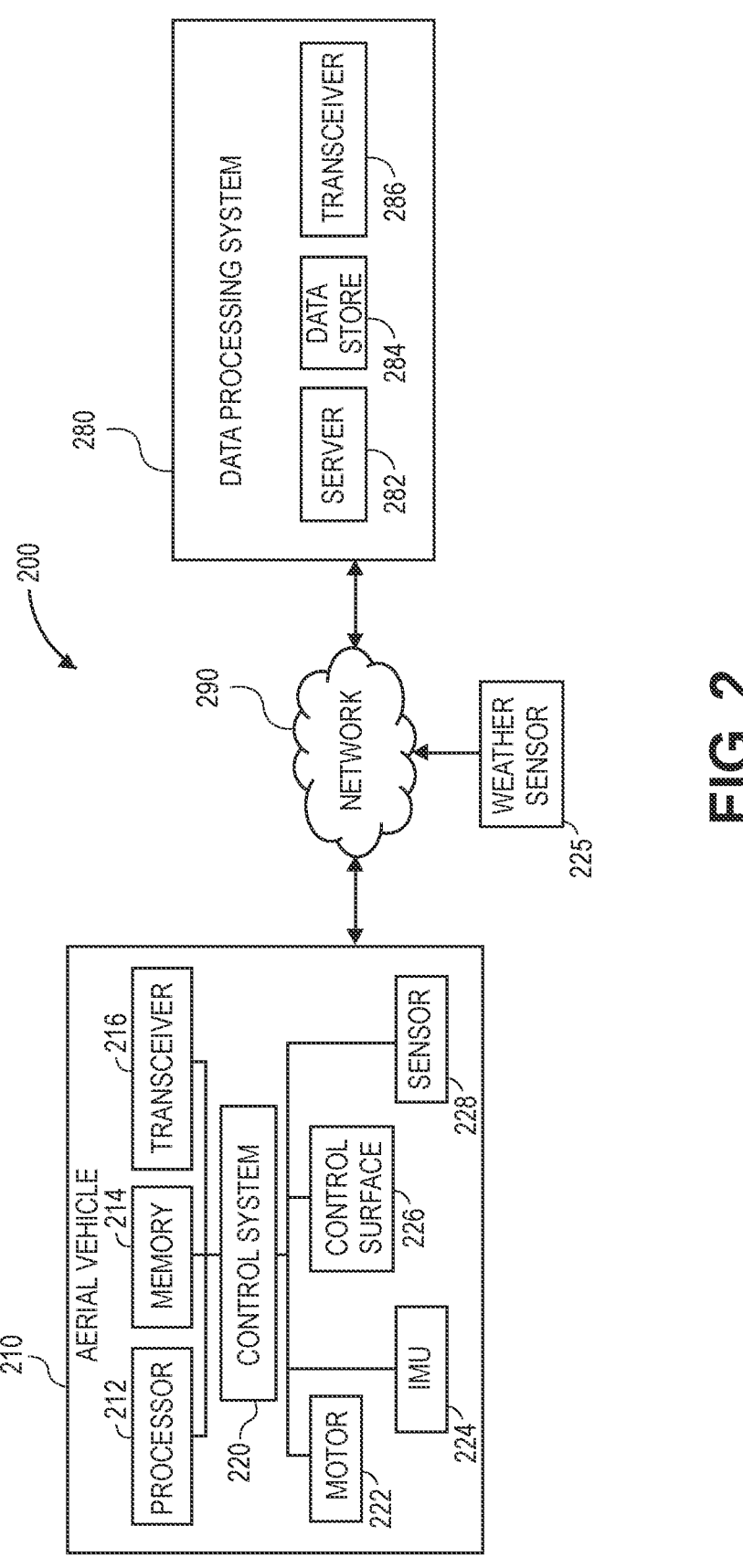
FIG. 2 is a block diagram of one system for forecasting wind conditions in accordance with implementations of the present disclosure.

Referring to FIG. 2, a block diagram of components of one system 200 for forecasting wind vectors in accordance with implementations of the present disclosure is shown. The system 200 of FIG. 2 includes an aerial vehicle 210, one or more weather sensors 225, and a data processing system 280 connected to one another over a network 290. Except where otherwise noted, reference numerals preceded by the number "2" shown in the block diagram of FIG. 2 indicate components or features that are similar to components or features having reference numerals preceded by the number "1" shown in FIGS. 1A through 1J.

The aerial vehicle 210 includes a processor 212, a memory 214 and a transceiver 216. The aerial vehicle 210 further includes a control system 220, one or more propulsion motors 222, an inertial measurement unit (or "IMU") 224, one or more control surfaces 226 and one or more sensors 228.

The processor 212 may be configured to perform any type or form of computing function associated with the operation of the aerial vehicle 210, including but not limited to the execution of one or more machine learning tools, algorithms or techniques. The processor 212 may also be configured to execute any other algorithms or techniques associated with one or more applications, purposes or functions of the aerial vehicle 210, or to select at least one of a course, a speed or an altitude for the operation of the aerial vehicle 210. For example, the processor 212 may be configured to control any aspects of the operation of the aerial vehicle 210 and the one or more computer-based components thereon, including but not limited to the motors 222, the inertial measurement unit 224, the control surfaces 226 or the sensors 228.

The processor 212 may also control the operation of one or more control systems or modules, such as the control system 220, for generating instructions for conducting operations of one or more of the propulsion motors 222, the inertial measurement unit 224, or the control surfaces 226, or for interpreting information or data captured by the sensors 228. Such control systems or modules may be associated with one or more other computing devices or machines, and may communicate with the data processing system 280 or one or more other computer devices or aerial vehicles (not shown) over the network 290, through the sending and receiving of digital data.

The processor 212 may be a uniprocessor system including one processor, or a multiprocessor system including several processors (e.g., two, four, eight, or another suitable number), and may be capable of executing instructions. For example, in some implementations, the processor 212 may be a general-purpose or embedded processor unit such as a CPU or a GPU having any number of instruction set architectures (ISAs), such as the x86, PowerPC, SPARC, or MIPS ISAs, or any other suitable ISA. Where the processor 212 is a multiprocessor system, each of the processors within the multiprocessor system may operate the same ISA, or different ISAs.

Additionally, the aerial vehicle 210 further includes one or more memory or storage components 214 (such as databases or data stores) for storing any type of information or data, e.g., instructions for operating the aerial vehicle 210, or information or data captured during operations of the aerial vehicle 210. The memory 214 may be configured to store executable instructions, imaging data, flight paths, flight control parameters and/or other data items accessible by or to the processor 212. The memory 214 may be implemented using any suitable memory technology, such as random-access memory (or "RAM"), static RAM (or "SRAM"), synchronous dynamic RAM (or "SDRAM"), nonvolatile/ Flash-type memory, or any other type of memory. In some implementations, program instructions, imaging data, flight paths, flight control parameters and/or other data items may be received or sent via the transceiver 216, e.g., by transmission media or signals, such as electrical, electromagnetic, or digital signals, which may be conveyed via a communication medium such as a wired and/or a wireless link.

The transceiver 216 may be configured to enable the aerial vehicle 210 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly. The transceiver 216 may further include or be in communication with one or more input/ output (or "I/O") interfaces, network interfaces and/or input/ output devices, and may be configured to allow information or data to be exchanged between one or more of the components of the aerial vehicle 210, or to one or more other computer devices or systems (e.g., other aerial vehicles, not shown) via the network 290. For example, in some implementations, the transceiver 216 may be configured to coordinate I/O traffic between the processor 212 and one or more onboard or external computer devices or components, e.g., the motors 222, the inertial measurement unit 224, the control surfaces 226 or the sensors 228, or any other devices or components (not shown). The transceiver 216 may perform any necessary protocol, timing or other data transformations in order to convert data signals from a first format suitable for use by one component into a second format suitable for use by another component. In some implementations, the transceiver 216 may include support for devices attached through various types of peripheral buses, e.g., variants of the Peripheral Component Interconnect (PCI) bus standard or the Universal Serial Bus (USB) standard. In some other implementations, functions of the transceiver 216 may be split into two or more separate components, or integrated with the processor 212.

The control system 220 may include one or more electronic speed controls, power supplies, navigation systems and/or payload engagement controllers for controlling aspects of the operation of the aerial vehicle 210, as desired. For example, the control system 220 may be configured to cause or control the operation of one or more of the motors 222, the inertial measurement unit 224, the control surfaces 226 or the sensors 228, or other components, such as to cause one or more of the motors 222 to rotate propellers at desired speeds or to cause such propellers to be aligned in selected positions or orientations. The control system 220 may further control any other aspects of the aerial vehicle 210, including but not limited to the operation of one or more aspects of the control surfaces 226, which may include wings, rudders, ailerons, elevators, flaps, brakes, slats or other features within desired ranges, or the enactment with or release of one or more items by one or more engagement systems (not shown). The control system 220 may also interpret data captured or signals generated by the inertial measurement unit 224, or the sensors 228. In some implementations, the control system 220 may be integrated with one or more of the processor 212, the memory 214 and/or the transceiver 216.

The motors 222 may be any type or form of motor (e.g., electric, gasoline-powered or any other type of motor) capable of generating sufficient rotational speeds of one or more propellers or other components to provide lift and/or thrust forces to the aerial vehicle 210 and any payload engaged thereby, to aerially transport the engaged payload thereby. In some implementations, one or more of the motors 222 may be a brushless DC multi-phase motor such as an outrunner brushless motor or an inrunner brushless motor.

The aerial vehicle 210 may include any number of motors 222 of any kind. For example, one or more of the motors 222 may be aligned or configured to provide forces of lift to the aerial vehicle 210, exclusively, while one or more of the motors 222 may be aligned or configured to provide forces of thrust to the aerial vehicle 210, exclusively. Alternatively, one or more of the motors 222 may be aligned or configured to provide forces of lift and forces of thrust to the aerial vehicle 210, as needed. For example, the motors 222 may be fixed in their orientation on the aerial vehicle 210, or configured to vary their respective orientations, e.g., a tilt-rotor aircraft. Moreover, the motors 222 may be aligned or configured to operate with different capacities or ratings, or at different speeds, or coupled to propellers having different sizes and shapes. For example, in some implementations, one or more of the motors 222 may be an electric motor, e.g., a brushless DC multi-phase motor, and one or more of the motors 222 may be a gasoline-powered motor.

Each of the motors 222 may be coupled to one or more propellers (or rotors or rotatable systems) having a plurality of shaped blades joined to a hub or boss. For example, each of such propellers may be rotatably mounted to a mast or shaft associated with a respective one of the motors 222 and may be configured to generate forces of thrust when rotated within a fluid. Each of such propellers may include any number of blades, and may be fixed pitch, adjustable pitch or variable pitch in nature. Moreover, one or more of such propellers may be banded or shielded in any manner. In some implementations, one or more propellers may be configured to rotate about a vertical axis, and to provide forces of lift in a vertical direction (e.g., upward) accordingly. In some other implementations, one or more of the propellers may be configured to rotate about a horizontal axis, and to provide forces of thrust in a horizontal direction (e.g., forward) accordingly. In still other implementations, one or more of the propellers may be configured to rotate about axes that are neither horizontal nor vertical, and to provide forces of lift and/or thrust in directions corresponding to such axes accordingly.

The inertial measurement unit 224 may be any type or form of onboard device for sensing changes in linear or rotational motion of the aerial vehicle 210. In some implementations, the inertial measurement unit 224 may include one or more gyroscopes, one or more accelerometers, one or more compasses (or other magnetometer), and a Global Positioning System ("GPS") transceiver. In some implementations, the inertial measurement unit 224 may be installed onboard the aerial vehicle 210, such as at or near a center of gravity of the aerial vehicle 210, or in another position aboard the aerial vehicle 210, and intended for use during in-flight operations, e.g., in association with an inertial navigation system. In some other implementations, however, the inertial measurement unit 224 may be strapped or mounted to an object suspended within the aerial vehicle 210.

Gyroscopes of the inertial measurement unit 224 may be any mechanical or electrical device, component, system, or instrument for determining an orientation, e.g., the orientation of the aerial vehicle 210. For example, the gyroscopes may be traditional mechanical gyroscopes, each having at least a pair of gimbals and a flywheel or rotor. Alternatively, the gyroscopes may be electrical components such as dynamically tuned gyroscopes, fiber optic gyroscopes, hemispherical resonator gyroscopes, London moment gyroscopes, microelectromechanical sensor gyroscopes, ring laser gyroscopes, or vibrating structure gyroscopes, or any other type or form of electrical component for determining an orientation of the aerial vehicle 210. In some implementations, the gyroscopes may generate angular rate data in any direction or along or about any axis.

Accelerometers of the inertial measurement unit 224 may be any mechanical or electrical devices, components, systems, or instruments for sensing or measuring accelerations, including but not limited to devices having one or more potentiometers, linear variable differential transformers, variable reluctance devices or piezoelectric components. For example, in some implementations, the accelerometers may be configured to capture acceleration data in any direction or along or about any axis, e.g., a triaxial accelerometer. The gyroscopes and/or the accelerometers of the inertial measurement unit 224 may be configured to generate angular rate data or acceleration data, respectively, at any rate or frequency, such as at frequencies ranging from zero to five hundred Hertz (0-500 Hz) or at frequencies greater than five hundred hertz (500 Hz).

Compasses of the inertial measurement unit 224 may be any devices, components, systems, or instruments adapted to determine one or more directions with respect to a frame of reference that is fixed with respect to the surface of the Earth (e.g., a pole thereof). For example, the compasses may include one or more magnetometers or other electrical components for measuring a strength of a magnetic field, such as a vector magnetometer or a scalar magnetometer (e.g., a proton precession magnetometer, an Overhauser magnetometer, an ionized gas magnetometer, a rotating coil magnetometer, a Hall Effect magnetometer, or the like). GPS transceivers may be any devices, components, systems, or instruments adapted to receive signals (e.g., trilateration data or information) relating to a position of the inertial measurement unit 224 from one or more GPS satellites of a GPS network (not shown), or for reporting the position of the inertial measurement unit 224 determined based on such signals. Alternatively, the GPS transceivers may be any devices or components for determining geolocations (e.g., geospatially-referenced points that precisely define an exact location in space with one or more geocodes), such as a set of geographic coordinates, e.g., a latitude and a longitude, and, optionally, an elevation that may be ascertained from signals (e.g., trilateration data or information) or geographic information system (or "GIS") data). Geolocations of the GPS transceivers or the inertial measurement unit 224 may be associated with the aerial vehicle 210, where appropriate.

In some implementations, the inertial measurement unit 224 may further include any number of computer components, e.g., one or more processors, memory components and/or transceivers (not shown), or any other components for aiding in the determination of accelerations, velocities, positions and/or orientations.

The control surfaces 226 may be any sections or appurtenances provided on surfaces of the aerial vehicle 210 that may be manipulated in order to dynamically modify a position or orientation of the aerial vehicle 210 with respect to one or more degrees of freedom. For example, the control surfaces 226 may include, but are not limited to, wings, rudders, ailerons, elevators, flaps, brakes or slats, or other features. In some implementations, each of the control surfaces 226 may include a motor, such as an electrical, mechanical and/or hydraulic or other component or actuator for rotating, translating or otherwise repositioning or reorienting a respective one of the control surfaces 226 during operation of the aerial vehicle 210, under the control of the one or more processors 212 or the control system 220. In some implementations, each of the control surfaces 226 may include a directional sensor, such as any type of sensor or other component that is embedded into one or more aspects of one of the control surfaces 226 (e.g., a leading edge, a trailing edge, a tip or one or more other faces or aspects of such surfaces 226) and configured to gather information or data with respect to an alignment or orientation thereof. For example, one of the control surfaces 226 may include digital cameras or other imaging devices (e.g., depth sensors, range cameras, infrared cameras, radiographic cameras or other optical sensors) that are configured to capture imaging data such as still or moving images, associated audio content or other data or metadata, within a field of view or along a particular axis or direction.

The sensors 228 may be any devices, systems or components that are configured to capture data regarding the aerial vehicle 210, or its surroundings, as the aerial vehicle 210 is engaged in operations or testing, or at any other time. In some implementations, the sensors 228 may include any number of sensors, e.g., a suite of such sensors, of any type or form. For example, the sensors 228 may be an imaging device including any form of optical recording sensor or device (e.g., digital cameras, depth sensors or range cameras, infrared cameras, radiographic cameras or other optical sensors) that may be configured to photograph or otherwise capture visual information or data (e.g., still or moving images in color or black and white that may be captured at any frame rates, or depth imaging data such as ranges), or associated audio information or data, or metadata, regarding objects or activities occurring within a vicinity of the aerial vehicle 210, for any purpose. For example, the sensors 228 may be configured to capture or detect reflected light if the reflected light is within a field of view of the sensors 228, which is defined as a function of a distance between an imaging sensor and a lens within the sensors 228, viz., a focal length, as well as a position of the sensors 228 and an angular orientation of the lens. Accordingly, where an object appears within a depth of field, or a distance within the field of view where the clarity and focus is sufficiently sharp, the sensors 228 may capture light that is reflected off objects of any kind to a sufficiently high degree of resolution using one or more sensors thereof, and store information regarding the reflected light in one or more data files.

The sensors 228 may also include manual or automatic features for modifying a field of view or orientation. For example, the sensors 228 may be a digital camera configured in a fixed position, or with a fixed focal length (e.g., fixed-focus lenses) or angular orientation. Alternatively, the sensors 228 may include one or more actuated or motorized features for adjusting a position of the sensors 228, or for adjusting either the focal length (e.g., zooming the imaging device) or the angular orientation (e.g., the roll angle, the pitch angle or the yaw angle), by causing a change in the distance between the imaging sensor and the lens (e.g., optical zoom lenses or digital zoom lenses), a change in the location of the sensors 228, or a change in one or more of the angles defining the angular orientation of the sensors 228.

For example, the sensors 228 may be an imaging device that is hard-mounted to the aerial vehicle 210 in a fixed configuration or angle with respect to one, two or three axes. Alternatively, however, the sensors 228 may be provided with one or more motors and/or controllers for manually or automatically operating one or more of the components, or for reorienting the axis or direction of the sensors 228, i.e., by panning or tilting the sensors 228. Panning the sensors 228 may cause a rotation within a horizontal plane or about a vertical axis (e.g., a yaw), while tilting the sensors 228 may cause a rotation within a vertical plane or about a horizontal axis (e.g., a pitch). Additionally, the sensors 228 may be rolled, or rotated about its axis of rotation, and within a plane that is perpendicular to the axis of rotation and substantially parallel to a field of view of the sensors 228.

Imaging data (e.g., still or moving images, as well as associated audio data or metadata) captured using the sensors 228 may be processed according to any number of recognition techniques. In some implementations, edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, or does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts.

The sensors 228 may further be or include one or more sound sensors (e.g., microphones, piezoelectric sensors, vibration sensors or other transducers for detecting and recording acoustic energy from one or more directions), speedometers, inclinometers, thermometers, barometers, hygrometers, air monitoring sensors (e.g., oxygen, ozone, hydrogen, carbon monoxide or carbon dioxide sensors), ozone monitors, pH sensors, moisture sensors, magnetic anomaly detectors, metal detectors, radiation sensors (e.g., Geiger counters, neutron detectors, alpha detectors), ranging sensors (e.g., radar, sonar or LIDAR ranging sensors) or others.

The sensors 228 may be further configured to capture, record and/or analyze information or data regarding the aerial vehicle 210, and to analyze such data or information by one or more means, e.g., by aggregating or summing such information or data to form one or more qualitative or quantitative metrics associated with the motion of the aerial vehicle 210. For example, a net vector indicative of any and all relevant movements of the aerial vehicle 210, including but not limited to physical accelerations, velocities, positions or orientations of the sensors 228, may be derived, and the net vector may include any other values associated with information or data captured by any of the sensors 228, e.g., images, sounds, or the like. Additionally, coefficients or scalars indicative of the relative movements of the aerial vehicle 210 may also be defined.

Although the aerial vehicle 210 shown in the block diagram of FIG. 2 includes a single box for a motor 222, a single box for an inertial measurement unit 224, a single box for a control surface 226, and a single box for a sensor 228, those of ordinary skill in the pertinent arts will recognize that any number or type of motors, inertial measurement units (or components thereof), control surfaces or sensors may be provided aboard the aerial vehicle 210 in accordance with the present disclosure. Alternatively, in some implementations, the aerial vehicle 210 may be a ground vehicle or any other object. The systems and methods of the present disclosure are not limited for use in connection with aerial vehicles.

As is shown in FIG. 2, the system 200 further includes one or more weather sensors 225, which may include any number of components for capturing, processing or transmitting information or data regarding weather conditions provided in a frame, a housing or another structure of any shape or size. For example, in some implementations, the weather sensors 225 may include an anemometer (e.g., a sonic anemometer) configured to measure or determine wind speeds in any direction, or in one or more axial directions. The weather sensors 225 may further include any number of processors, memory components, or other components which may be provided on a printed circuit board assembly, or on any other system. The weather sensors 225 may be configured to receive power from one or more external sources, e.g., by one or more wires, or may include one or more internal power sources such as batteries, fuel cells, solar cells, or others. The weather sensors 225 may also include transceivers for communicating via wired or wireless means, e.g., wired technologies such as USB or fiber optic cable, or standard wireless protocols or technologies such as cellular, Bluetooth® or any Wi-Fi protocol.

Although the system 200 shown in the block diagram of FIG. 2 includes a single box corresponding to one weather sensor 225, those of ordinary skill in the pertinent arts will recognize that any number or type of weather sensors may be utilized in accordance with the present disclosure.

As is shown in FIG. 2, the data processing system 280 includes one or more physical computer servers 282 having one or more data stores 284 and one or more transceivers 286 associated therewith, and may be provided for any specific or general purpose. For example, the data processing system 280 may be independently provided for the exclusive purpose of receiving, analyzing or storing information or data received from the aerial vehicle 210 or the weather sensors 225. Alternatively, the data processing system 280 of FIG. 2 may be provided in connection with one or more physical or virtual services configured to receive, analyze or store such information or data, as well as one or more other functions.

In some implementations, the data processing system 280 may be configured to perform, execute or solve any number of mathematical formulas, equations or relationships. For example, in some implementations, the data processing system 280 may be configured to execute one or more differential equations, e.g., partial differential equations, or solve for any relationships. In some implementations, the data processing system 280 may be configured to execute any number of simulations or modeling techniques, such as by modeling flow of air from any direction and at any velocity over or between such obstacles. For example, in some implementations, the data processing system 280 may be configured to select flow regimes or conditions subject to any number or set of rules, or on any other basis, and may simulate flow conditions according to one or more simulations, e.g., computational fluid dynamics simulations such as large-eddy simulations or others. The flow conditions may be simulated by solving for any calculations to predict wind flows at various locations within computational domains.

The servers 282 may be connected to or otherwise communicate with the data stores 284 and the transceiver 286. The data stores 284 may store any type of information or data, including but not limited to information or data received from the aerial vehicle 210, from the weather sensors 225, or from any other source, for any purpose. The transceiver 286 may share any of the features, properties or attributes of the transceiver 216 described above, or may have one or more different features, properties or attributes. The servers 282 and/or the transceiver 286 may also connect to or otherwise communicate with the network 290, through the sending and receiving of digital data. For example, the data processing system 280 may include any facilities, stations or locations having the ability or capacity to receive and store information or data, such as media files, in one or more data stores, e.g., media files received from the aerial vehicle 210, from the weather sensors 225, or from one another, or from one or more other external computer systems (not shown) via the network 290. In some implementations, the data processing system 280 may be provided in a physical location. In other such implementations, the data processing system 280 may be provided in one or more alternate or virtual locations, e.g., in a "cloud"-based environment. In still other implementations, the data processing system 280 may be provided onboard one or more aerial vehicles, including but not limited to the aerial vehicle 210, or in association with any of the weather sensors 225.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some implementations, the network 290 may be a private or semi-private network, such as a corporate or university intranet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The aerial vehicle 210, the weather sensors 225, or the data processing system 280 may use any web-enabled or Internet applications or features, or any other client-server applications or features including E-mail or other messaging techniques, to connect to the network 290, or to communicate with one another. For example, the aerial vehicle 210 or the weather sensors 225 may be adapted to transmit information or data in the form of synchronous or asynchronous messages to the data processing system 280 or to any other computer device in real time or in near-real time, or in one or more offline processes, via the network 290. Those of ordinary skill in the pertinent art would recognize that the aerial vehicle 210, the weather sensors 225 or the data processing system 280 may operate, include or be associated with any of a number of computing devices that are capable of communicating over the network 290. The protocols and components for providing communication between such devices are well known to those skilled in the art of computer communications and need not be described in more detail herein.

Data and/or computer-executable instructions, programs, firmware, software and the like described herein may be stored on a computer-readable medium that is within or accessible by computers or computer components such as the processor 212 or the server 282, or any other computers or control systems utilized by the aerial vehicle 210, the weather sensors 225 or the data processing system 280, and having sequences of instructions which, when executed by a processor (e.g., a central processing unit, or "CPU"), cause the processor to perform all or a portion of the functions, services and/or methods described herein. Such computer-executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Referring to FIG. 3, a flow chart 300 of one process for forecasting wind conditions in accordance with implementations of the present disclosure is shown.

At box 310, a first grid (or graph, or another representation) of predicted wind vectors above a ground region generated at a first resolution is identified. For example, the first grid may include or represent a set of predictions of vectors at points in three-dimensional space above a surface of the ground region at a first resolution, which may be defined according to a scale or standard representing distances between the respective points of the first grid, or lengths and widths of cells of the first grid. In some implementations, the first grid may include or define any number of cells having shapes of squares, such that lengths and widths of the cells of the first gird are equal to one another. In some other implementations, however, the first grid may include or define any number of cells having shapes of rectangles other than squares, such that lengths and widths of the cells of the first gird are not equal to one another.

The predicted wind vectors may include predicted wind speeds according to any units and predicted wind directions at each of the points of the first grid. The predicted wind vectors may represent flows in a two-dimensional horizontal plane of the grid, e.g., in a wind plane at a fixed altitude with respect to a ground surface, or in a three-dimensional space, e.g., with both horizontal and vertical components.

The ground region may include an area having any size or shape, and may include land (e.g., terra firma) or water (e.g., standing water such as lakes or ponds, or running water such as streams or rivers) in any portion or percentage. The predicted wind vectors over the ground region may have been generated in any manner with respect to any atmospheric factors or physical attributes of the ground region.

For example, a set of predicted wind vectors above the ground region may have been obtained from a service operated by any governmental agency, from a private service, or from any other source. In some implementations, the first grid may have been generated by the High-Resolution Rapid Refresh ("HRRR") model maintained by the United States National Oceanic & Atmospheric Administration, or the European Centre for Medium-Range Weather Forecasts (or "ECMWF") model. The HRRR model generates predicted wind vectors in grids having levels of resolution of three kilometers by three kilometers, and at altitudes of approximately ten meters and eighty meters above ground level (or "AGL"), while the ECMWF model generates predicted wind vectors (e.g., speeds and directions) at altitudes of approximately ten meters and one hundred meters above ground level. Alternatively, the set of predicted wind vectors may have been obtained from any other source.

At box 320, surface roughness metrics that were utilized in generating the first grid are determined. For example, each of the surface roughness metrics of the first set may be any metric or value representative of elements provided on surfaces of corresponding portions of the ground region below the first grid and their effect on wind flow. The surface roughness metrics of the first set may have been calculated, derived, or associated with the ground region in any manner. In some implementations, the surface roughness metrics of the first set may be roughness lengths, which may be calculated based on a frontal area of an average element of the ground region that faces wind, divided by a width occupied by the average element. Alternatively, or additionally, roughness lengths may be assigned to corresponding portions of the ground region below the first grid based on a category or label characterizing a surface composition or physical characteristic of such portions.

At box 330, a second resolution and a second set of surface roughness metrics for generating a second grid of predicted wind vectors above the ground region are selected. The second resolution may be defined based on any factor, including but not limited to a desired level of fineness or accuracy of predictions of wind vectors. In some implementations, the second resolution may be defined according to a scale or standard representing distances between the points of the second grid, or lengths and widths of cells of the second grid. In some implementations, in order to ensure that the second resolution is greater than the first resolution, the distances between the respective points of the second grid, or the lengths and widths of the cells of the second grid, may be substantially smaller than the distances between the respective points of the first grid, or the lengths and widths of the cells of the first grid, e.g., by a fraction such as one-half, one-third, one-fourth, one-tenth, or any other fraction.

The second set of surface roughness metrics may be selected on any basis and from any source, and may be likewise representative of elements provided on surfaces of corresponding portions of the ground region below the second grid and their effect on wind flow. The surface roughness metrics of the second set may have been calculated, derived, or associated with the ground region in any manner. In some implementations, the second set of surface roughness metrics may be identified or obtained from a standard or registry of such metrics obtained from a governmental agency or a private source.

For example, in some implementations, the surface roughness metrics may be obtained from the National Land Cover Database (or "NLCD"), which includes data regarding classifications of ground surfaces at thirty meter by thirty meter resolution, for each of the portions or regions of the second grid. Where coordinates or other identifiers of points of the second grid, or sides or edges of cells of the second grid, are known, such coordinates or identifiers may be relied upon to obtain classifications of portions of the ground region corresponding to each of the cells from the NLCD or from any other source.

At box 340, a second grid of predicted wind vectors above the ground region is generated based on the first grid of predicted wind vectors, the second resolution, the first surface roughness metric and the second surface roughness metric, and the process ends.

The second grid of predicted wind vectors may be derived in any manner, such as by transforming a predicted wind vector of a given portion of the first grid to another predicted wind vector of a corresponding portion of the second grid, based on differences between the surface roughnesses of the portions of the ground region beneath each of the respective portions of the first grid and the second grid. For example, for a raw wind speed $u_0$ of a predicted wind vector of a given cell of the first grid, a wind speed u of any given cell of the second grid at an altitude z may be calculated according to a log-law transformation as a function of the altitude z, a roughness length $z_0$ of a portion of a ground region below a cell of the first grid determined at box 320, and a roughness length $z_n$ of a portion of a ground region below a cell of the second grid selected at box 330. In some implementations, the wind speed u may be calculated according to Equation (1), below:

$$u = u_0 \cdot \ln(z/z_n)/\ln(z/z_0) \qquad (1)$$

The process of calculating the wind speed u may be repeated for each of the cells of the second grid, e.g., by providing the raw wind speed $u_0$ of a corresponding cell of the first grid, the roughness length $z_0$ of the corresponding cell of the first grid, and the roughness lengths $z_n$ of the respective cells of the second grid to Equation (1). Moreover, where the cell of the first grid for which the raw wind speed $u_0$ is determined is not at the same altitude z as the cell of the second grid for which the wind speed u is sought, the raw wind speed $u_0$ may be adjusted or modified accordingly to derive a wind speed for the cell of the second grid at the altitude z. In some implementations, where two or more raw wind speeds are available at different altitudes for cells of the first grid, such as where the wind speeds are obtained according to the HRRR or ECMWF models, a wind speed for the cell of the second grid at the altitude z may be determined by interpolation or in any other manner.

Alternatively, in some implementations, the second grid of predicted wind vectors may be generated in any other manner. For example, in some implementations, wind vectors may be calculated for each of the cells according to a Monin-Obukhov transformation using a stability correction function and an Obukhov length calculated or approximated based on a density of air within a cell, a specific heat capacity of the air, an air temperature, a friction velocity, a von Karman constant, gravity, sensible and latent heat fluxes, or other factors.

As is discussed above, a first set of predicted wind vectors over a ground region may be used to generate or derive a second set of predicted wind vectors having greater resolution than the first set by defining a grid of spaces above the ground region and transforming the first set of predicted wind vectors using information or data regarding surface roughness within the ground region. Referring to FIGS. 4A through 4E, views of aspects of one system for forecasting wind conditions in accordance with implementations of the present disclosure are shown. Except where otherwise noted, reference numerals preceded by the number "4" shown in FIGS. 4A through 4E indicate components or features that are similar to components or features having reference numerals preceded by the number "2" shown in the block diagram of FIG. 2 or by the number "1" shown in FIGS. 1A through 1J.

Figure 4A:
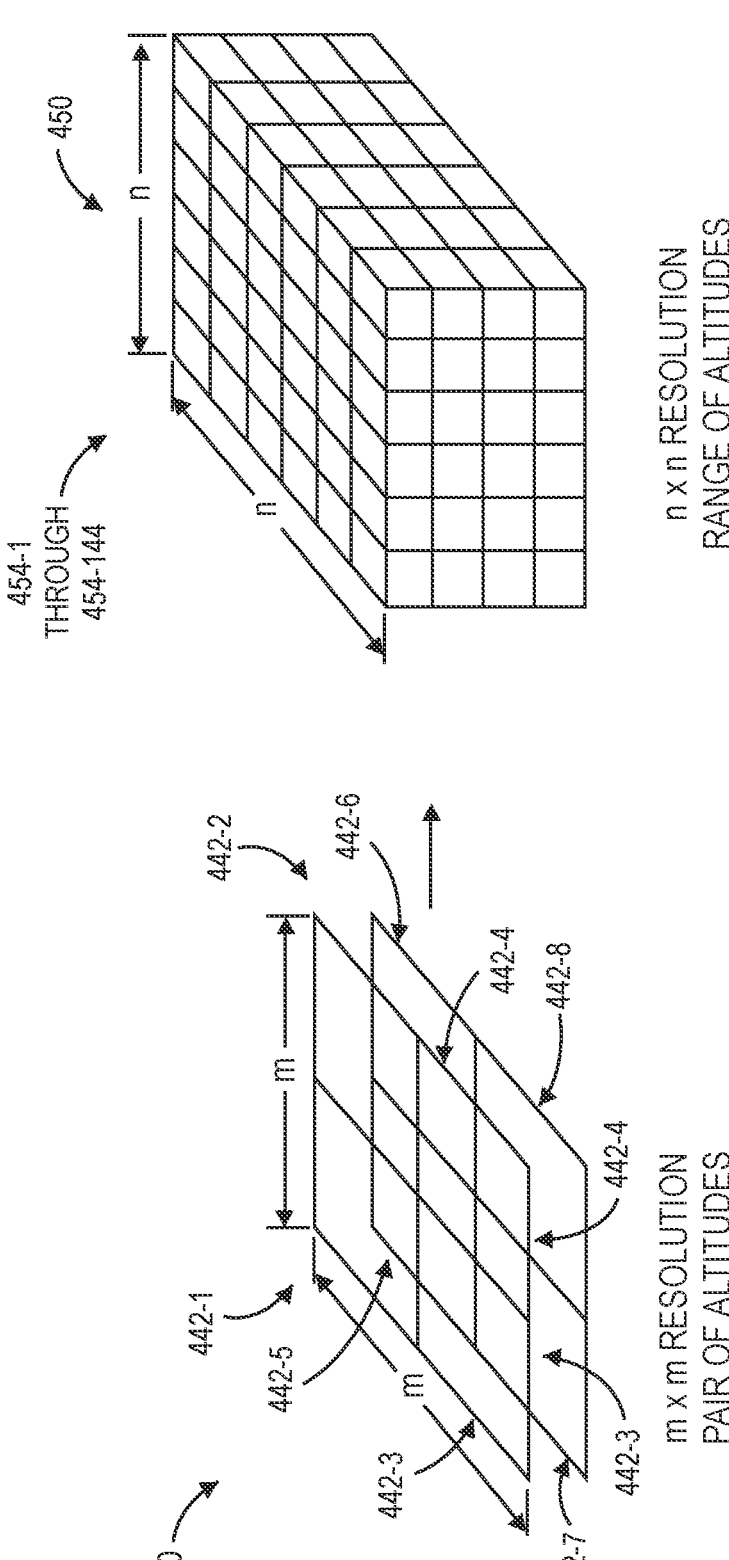

As is shown in FIG. 4A, a first grid 440 for use in predicting wind vectors includes cells 442-1 through 442-4, 442-5 through 442-8 arranged in a pair of two-dimensional planes having square shapes and a resolution of m×m, where m=2. The first grid 440 may be used to represent predicted wind vectors at a pair of altitudes above a portion of a ground region, e.g., within the cells 442-1 through 442-4, 442-5 through 442-8 of the first grid 440 at the respective altitudes.

As is also shown in FIG. 4A, a second grid 450 for use in predicting wind vectors includes cells 454-1 through 454-144 in three-dimensional space and has a resolution of n×n, where n=6. The second grid 450 may be used to represent predicted wind vectors at multiple altitudes above the same portion of the ground region as the first grid 440, and within the cells 454-1 through 454-144 of the second grid 450 at the respective altitudes. The resolution of the second grid 450 is greater than the resolution of the first grid 440, in that the second grid 450 includes a greater number of cells arranged over the same horizontal area as the first grid 440, and the cells 442-1 through 442-8 of the second grid 450 are smaller in size than the cells 454-1 through 454-144 of the first grid 440.

Figure 4B:
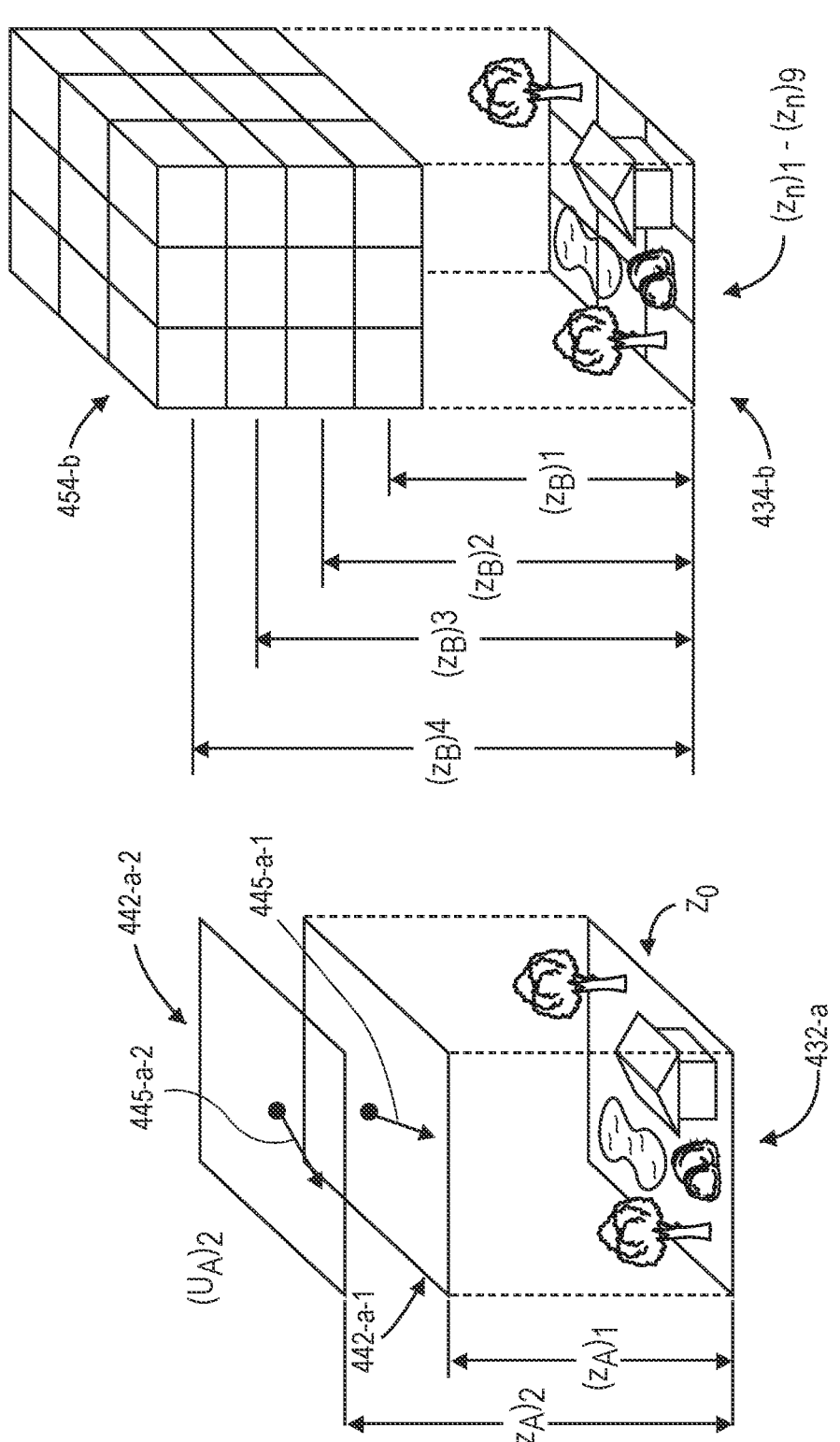

As is shown in FIG. 4B, a pair of representative cells **442-*a*-1, 442-*a*-2 of the cells 442-1 through 442-4, 442-5 through 442-8 of the first grid 440 are shown. The representative cell 442-*a*-1 is provided at an altitude $(z_A)_1$ above a portion 432-*a* of a ground region having a surface roughness metric (e.g., a surface roughness length) $z_0$, and the representative cell 442-*a*-2 is provided at an altitude $(z_A)_2$ above the representative cell 442-*a*-1 at the altitude $(z_A)_1$, and also above the portion 432-*a*** of the ground region.

Additionally, as is further shown in FIG. 4B, a predicted wind vector **445-*a*-1 has been calculated for the cell 442-*a*-1, and a predicted wind vector 445-*a*-2 has been calculated for the cell 442-*a*-2. The predicted wind vectors 445-*a*-1, 445-*a*-2 may have been calculated in any manner, such as according to the HRRR model or the ECMWF model. For example, where the predicted wind vectors 445-*a*-1, 445-*a*-2 are determined according to the HRRR model, the altitudes $(z_A)_1$, $(z_A)_2$ above the portion 432-*a* may be ten meters and eighty meters, respectively. Where the predicted wind vectors 445-*a*-1, 445-*a*-2 are determined according to the ECMWF model, the altitudes $(z_A)_1$, $(z_A)_2$ above the portion 432-*a*** may be ten meters and one hundred meters, respectively.

As is also shown in FIG. 4B, a representative set of cells **454-*b* of the cells 454-1 through 454-144 of the second grid 450 are shown above a plurality of portions 434-*b* of the ground region, which occupy the same area of the ground region as the portion 432-*a*. The representative set of cells 454-*b* includes nine cells of the second grid 450 at four altitudes $(z_B)_1$, $(z_B)_2$, $(z_B)_3$, $(z_B)_4$ above respective portions 434-*b* of the ground region. The representative set of cells 454-*b* has the same horizontal dimensions and occupies the same area in the aggregate as the representative cell 442-*a*-1 or the representative cell 442-*a*-2, and the portions 434-*b* occupy the same area of the ground region as the portion 432-*a*. Additionally, the portions 434-*b*** of the ground region have corresponding surface roughness metrics (e.g., surface roughness lengths) $(z_n)_1$ through $(z_n)_9$.

In order to predict wind vectors at locations corresponding to cells of the second grid 450, predicted wind vectors of the first grid 440 may be transformed using the surface roughness lengths and altitudes of the corresponding cells of the first grid 440 and the second grid 450. As is shown in FIG. 4C, a predicted wind vector **456-*b*-*j* of a set of the cells 452-*b*-*j* of the second grid 450 at a common altitude $(z_B)_j$, or $(u_B)_j$, may be calculated based on the predicted wind vectors 445-*a*-1, 445-*a*-2 of the representative cells 442-*a*-1, 442-*a*-2 of the first grid 440. For example, the predicted wind vector 456-*b*-*j* may be calculated based on the predicted wind vectors 445-*a*-1, 445-*a*-2 and also the altitudes $(z_A)_1$, $(z_A)_2$ of the representative cells 442-*a*-1, 442-*a*-2, and the altitude $(z_B)_j$ of the set of the cells 452-*b*-*j***, e.g., by interpolation, or by any other technique.

For example, in some implementations, the predicted wind vector **456-*b*-*j* may be calculated by assuming a linear slope or relationship between the altitude $(z_A)_1$ and the predicted wind vector 445-*a*-1, and the altitude $(z_A)_2$ and the predicted wind vector 445-*a*-2, and calculating or estimating a speed or vector of wind at the altitude $(z_B)_j$ based on the linear slope or relationship. Alternatively, the predicted wind vector 456**-*b-j* may be calculated based on the predicted wind vectors 445-*a-*1, 445-*a-*2 and the altitudes $(z_A)_1$, $(z_A)_2$ in any other manner.

Figure 4D:
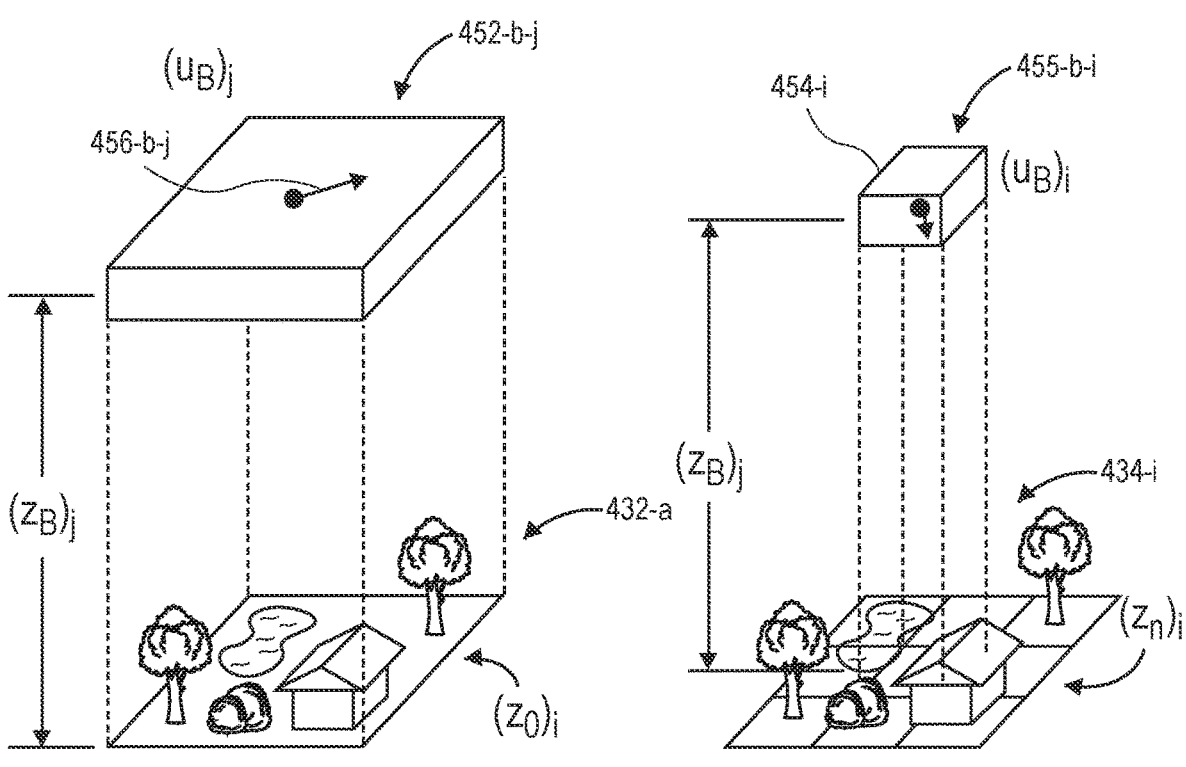

Once a predicted wind vector has been calculated for a set of cells of a downscaled grid at a common altitude above a ground surface, e.g., at a first level of resolution, predicted wind vectors may be calculated for each of the cells of the set, e.g., at a second level of resolution greater than the first level of resolution, based on the surface roughnesses of the respective portions of the ground surface below each of the cells. As is shown in FIG. 4D, a predicted wind vector 455-*b-i*, or $(u_B)_i$, may be calculated for a representative cell 454-*i* of the second grid 450 at an altitude $(z_B)_i$ over a portion 434-*i* of the ground surface by transforming the predicted wind vector 456-*b-j* calculated for 452-*b-j* the cells of the second grid 450 at the altitude $(z_B)_j$, or $(u_B)_j$, based on the altitude $(z_B)_j$, the surface roughness $z_0$ of the portion 432-*a* of the ground region below a set of cells 452-*j* that includes the representative cell 454-*i*, and the surface roughness $(z_n)_j$ of the portion 434-*i* below the representative cell 454-*i*. The predicted wind vectors 456-*b-j* may be transformed from the resolution of the first grid 440 to the resolution of the second grid 450 by a log-law transformation, by a Monin-Obukhov transformation, or by any other technique.

For example, as is shown in FIG. 4D, the predicted wind vector 455-*b-i*, or $(u_B)_i$, may be calculated for the cell 454-*i* based on a product of the predicted wind vector 456-*b-j*, or $(u_B)_j$, and a natural log of the altitude $(z_B)_j$ divided by the surface roughness metric $(z_n)_i$ of the portion 432-*i* of the ground surface below the cell 454-*b-i* of the second grid 450, or in $((z_B)_j/(z_n)_i)$, divided by a natural log of the altitude $(z_B)_j$ divided by the surface roughness metric $(z_0)_j$ of the portion 432-*a* of the ground surface below the set of cells 452-*b-j*, or in $((z_B)_j/(z_0)_j)$. Alternatively, the predicted wind vector 455-*b-i*, or $(u_B)_i$, may be calculated for the cell 454-*i* by any other form of transformation, or in any other manner.

Figure 4E:
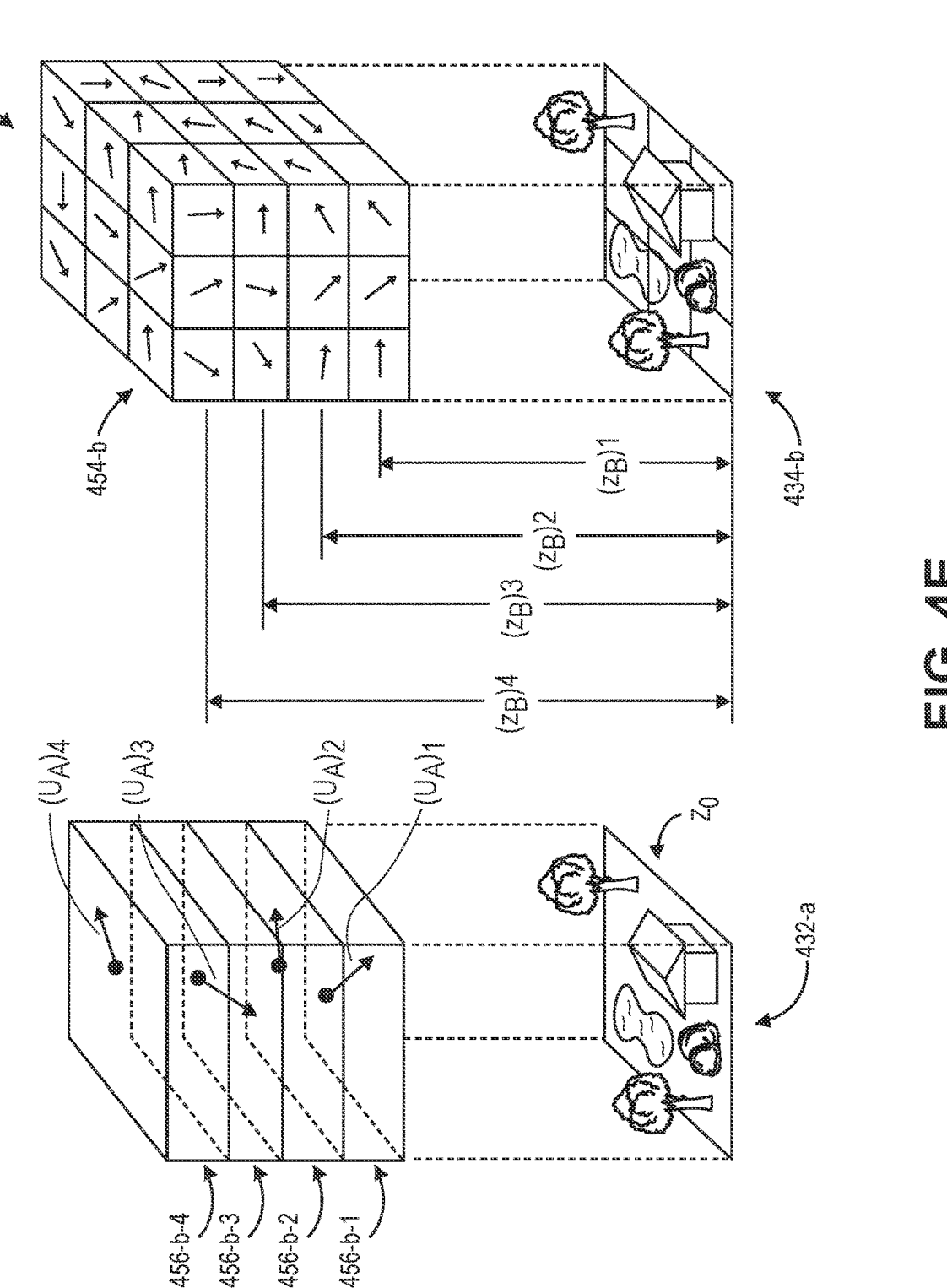

Predicted wind vectors may be calculated for each of the cells 454-1 through 454-144 of the second grid 450 based on predicted wind vectors calculated for each of the altitudes of the second grid 450, or $(u_B)_1$, as well as surface roughness metrics of portions of the ground surface below the respective cells 454-1 through 454-144, according to the transformation formula shown in FIG. 4D, or in any other manner. Referring to FIG. 4E, a set of predicted wind vectors 455-*b* over portions 434-*b* of the ground region is calculated for the cells 454-*b* of the second grid 450 based on the predicted wind vectors 456-*b-*1, 456-*b-*2, 456-*b-*3, 456-*b-*4, or $(u_B)_1$, $(u_B)_2$, $(u_B)_3$, $(u_B)_4$ over the portion 432-*a* of the ground region, as well as the altitudes $(z_B)_1$, $(z_B)_2$, $(z_B)_3$, $(z_B)_4$ over the portions 434-*b*, the surface roughness metric $z_0$ of the portion 432-*a* and the surface roughness metrics $(z_n)_1$ through $(z_n)_9$ of the portions 434-*b*. Sets of predicted wind vectors over other portions of the ground region 430, e.g., portions below each of the respective cells 442-1, 442-2, 442-3, 442-4, 442-5, 442-6, 442-7, 442-8, may be calculated in the same manner or a similar manner until wind vectors have been predicted for each of the cells 454-1 through 454-144.

Figure 5:
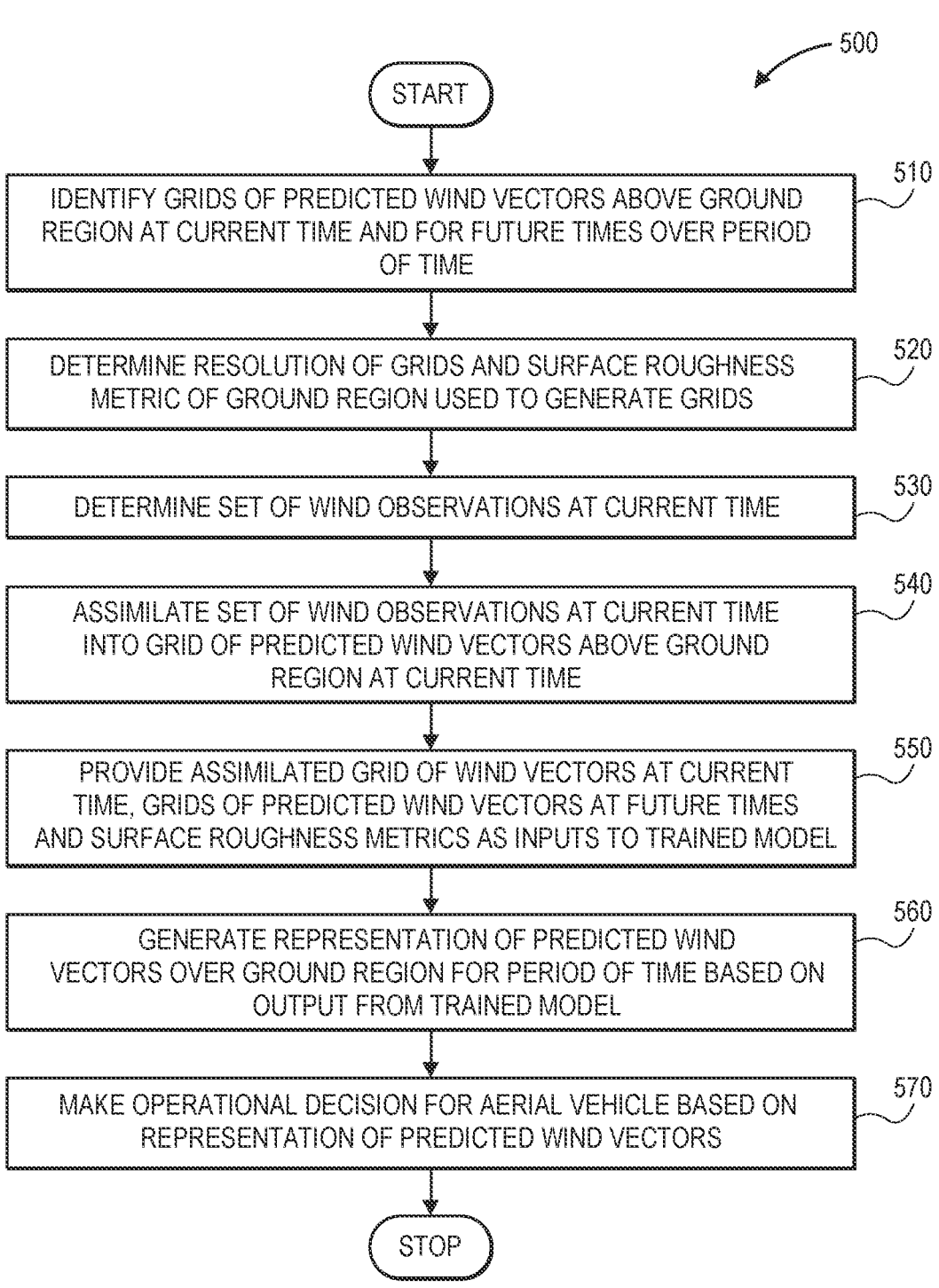
FIG. 5 is a flow chart of one process for forecasting wind conditions in accordance with implementations of the present disclosure.

Referring to FIG. 5, a flow chart 500 of one process for forecasting wind conditions in accordance with implementations of the present disclosure is shown.

At box 510, grids of wind vectors above a ground region predicted for a current time, and at future times over a period of time, are identified. For example, the grids of wind vectors may be generated by a standard model, e.g., the HRRR model or the ECMWF model, at a current time (or an initial time), and at future intervals of a designated duration beyond the current time, such as fifteen minutes, thirty minutes, sixty minutes, or other intervals. Moreover, any number of grids of predicted wind vectors above the ground region may be generated. For example, in some implementations, where grids of predicted wind vectors are generated at fifteen-minute intervals, the grids identified at box 510 may include a grid of wind vectors predicted for a current time (or an initial time), as well as grids of wind vectors predicted for times fifteen minutes, thirty minutes, forty-five minutes, sixty minutes, seventy-five minutes and ninety minutes into the future, or any additional number of grids of wind vectors predicted for future times.

The ground region may have any size or shape, and the grids may have any levels of resolution or dimensions, and may likewise have any size and shape. Moreover, the grids may include any number of points or may define any number of cells. The wind vectors of the grid may represent flows in two-dimensional horizontal planes of the grid, e.g., at points in a wind plane at a fixed altitude with respect to a ground surface, or flows within three-dimensional spaces, e.g., with both horizontal and vertical components.

At box 520, a resolution of the grids and a surface roughness metric for the ground region that was utilized to generate the grids are determined. For example, the grids may be defined according to any scale or standard representing distances between the respective points of the grids, or lengths and widths of cells of the grids. In some implementations, the grids may include or define any number of cells having shapes of squares, or shapes of rectangles other than squares.

In some implementations, a grid includes cells with horizontal resolution of one kilometer by one kilometer square each in the horizontal plane, and vertical resolution of ten meters. Thus, where the ground region is substantially large, with dimensions of twenty-five kilometers by twenty-five kilometers in a horizontal plane, and one hundred twenty meters in a vertical direction, the grid includes 7,500 cells, each corresponding to a space having a one kilometer by one kilometer area in the horizontal plane, and a height of ten meters.

Likewise, each of the surface roughness metrics for the cells of the ground region below the grids may be roughness lengths, which may be calculated based on a frontal area of an average element of the ground region that faces wind, divided by a width occupied by the average element. Alternatively, or additionally, roughness lengths may be determined based on a category or label characterizing a surface composition or physical characteristic of such portions.

At box 530, a set of wind observations over the ground region at the current time are determined. The wind observations may be captured or determined by any type or form of sensor, e.g., one or more anemometers or other wind sensors, which may be mounted to one or more fixed objects or structures within the ground region, to one or more mobile systems, such as automobiles, aerial vehicles, or other systems. For example, in some implementations, one or more of the wind observations may be captured by sensors provided at a public or private weather station or another location. Alternatively, in some implementations, one or more of the wind observations may be captured by sensors provided aboard an aerial vehicle traveling over the ground region.

At box 540, the set of wind observations over the ground region at the current time determined at box 530 is assimilated into the grid of predicted wind vectors at the current time. For example, any number of techniques may be applied to assimilate observed wind vectors with predicted wind vectors for the current time. In some implementations, the observed wind vectors may be assimilated with the grid of predicted wind vectors according to an optimal interpolation technique. For example, where a grid of predicted wind vectors is identified at box 510, and a set of weather observations y is determined at box 530, a grid of assimilated wind vectors may be generated according to Equation (2), below:

$$X_a = X_b + K(y - H(X_b)) \tag{2}$$

where $X_a$ is the grid of assimilated wind vectors, $X_b$ is the grid of predicted wind vectors, K is the Kalman gain weighting matrix, y is the set of weather observations, and $H(X_b)$ is a set of the predicted wind vectors at the locations from which the set of weather observations y were captured.

The Kalman gain weighting matrix K may be defined according to Equation (3), below:

$$K = B \cdot H^T (H \cdot B \cdot H^T + R)^{-1} \tag{3}$$

where B is a background field error covariance matrix, R is a diagonal observational variance matrix, and H is a linear transformation matrix to the observational space. Thus, the Kalman gain weighting matrix K may represent a background error covariance in the observational space multiplied by an inverse of a total error covariance. The background field error covariance matrix B may be calculated according to Equation (4), below:

$$B = D\rho D \tag{4}$$

where D is the diagonal matrix of the background error standard deviation of size m×m, where ρ is the correlation coefficient matrix of size m×m, and where m is a number of grid points.

Alternatively, in some implementations, the observed wind vectors may be assimilated with the grid of predicted wind vectors according to a Bayesian technique, a Monte Carlo technique, or in any other manner.

At box 550, at least the assimilated grid of wind vectors at the current time generated at box 540, along with the other grids of predicted wind vectors at the future times over the period of time and the surface roughness metric are provided as inputs to a trained model.

In some implementations, the inputs to the model may include other features, in addition to the assimilated grid of wind vectors and the other grids of predicted wind vectors, as well as the surface roughness metric. For example, information or data regarding temperature forecasts, radiation forecasts, cloud cover, or any other relevant features.

In some implementations, the model may be trained by supervised learning, and may include one or more decision trees, e.g., a gradient-boosted decision trees library. In some implementations, the model may be an XGBoost machine learning algorithm.

At box 560, a representation of predicted wind vectors over the period of time is generated based on outputs received from the trained model.

The representation may include, for each of the cells of the grid, wind vector forecasts for each point of the grid, and at any number of times in the future. For example, in some implementations, the representation may include minute-by-minute predictions of vectors over the period of time.

At box 570, one or more operational decisions for an aerial vehicle are made based on the representation of the predicted wind vectors, and the process ends. For example, in some implementations, the representation may be processed or interpreted to determine whether an aerial vehicle may perform a mission over the ground region, or whether the mission should be postponed, canceled or scrubbed. In some other implementations, the representation may be processed or interpreted to select one or more courses, speeds or altitudes for an aerial vehicle during a mission over the ground region. In still other implementations, the representation may be processed or interpreted to predict a time required to perform a mission over the ground region, e.g., a delivery time, such as where the mission requires a delivery of an item to or from a location within the ground region.

Figure 6A:
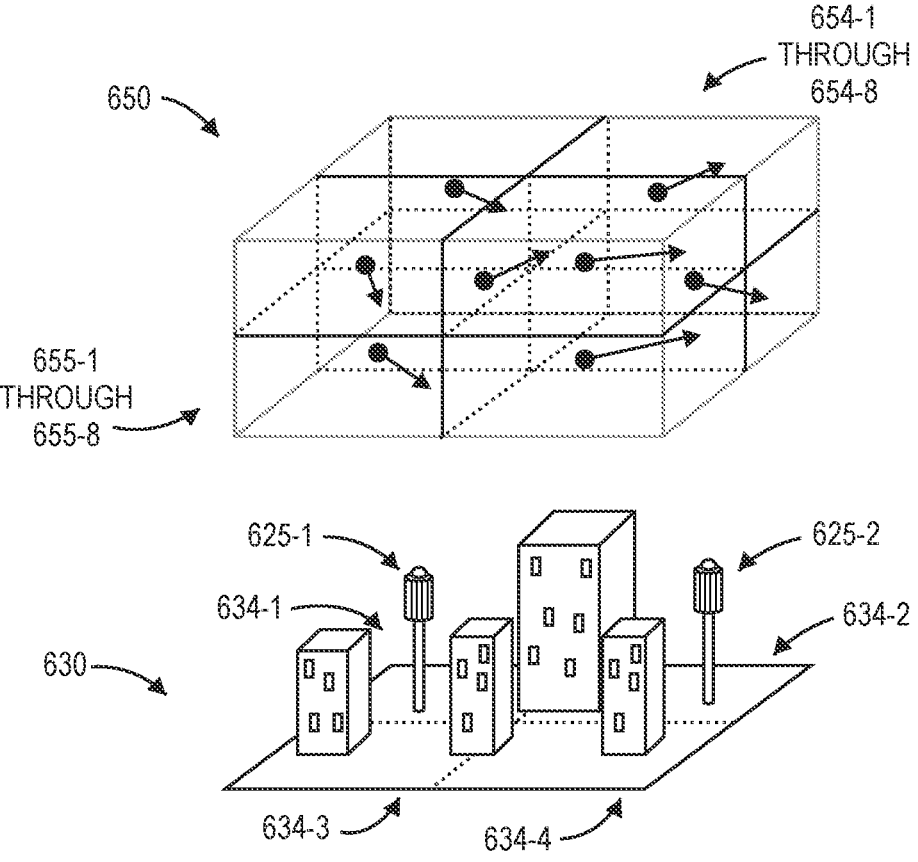
FIGS. 6A through 6C are views of aspects of one system for forecasting wind conditions in accordance with implementations of the present disclosure.
Figure 6B:
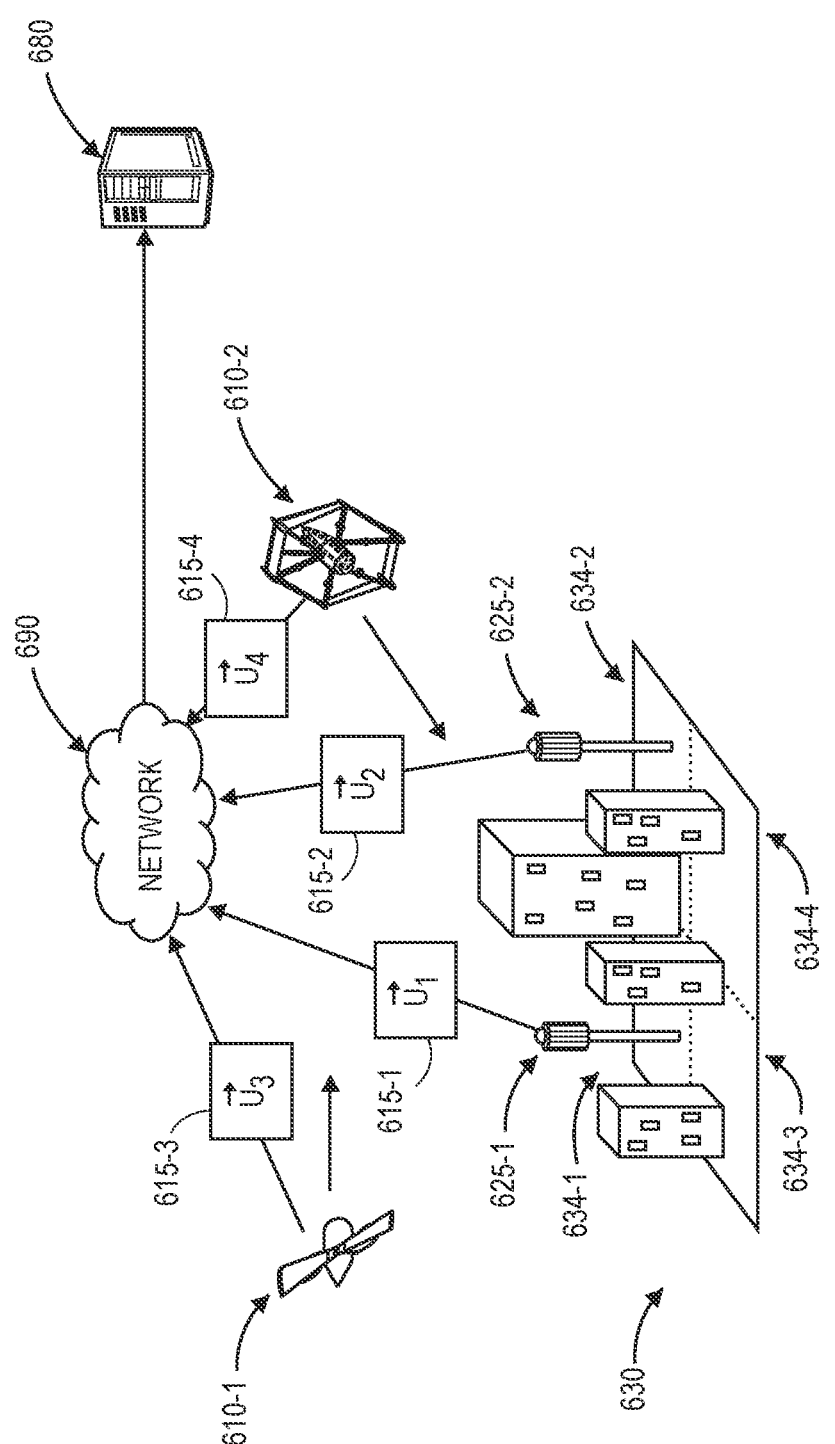
Figure 6C:
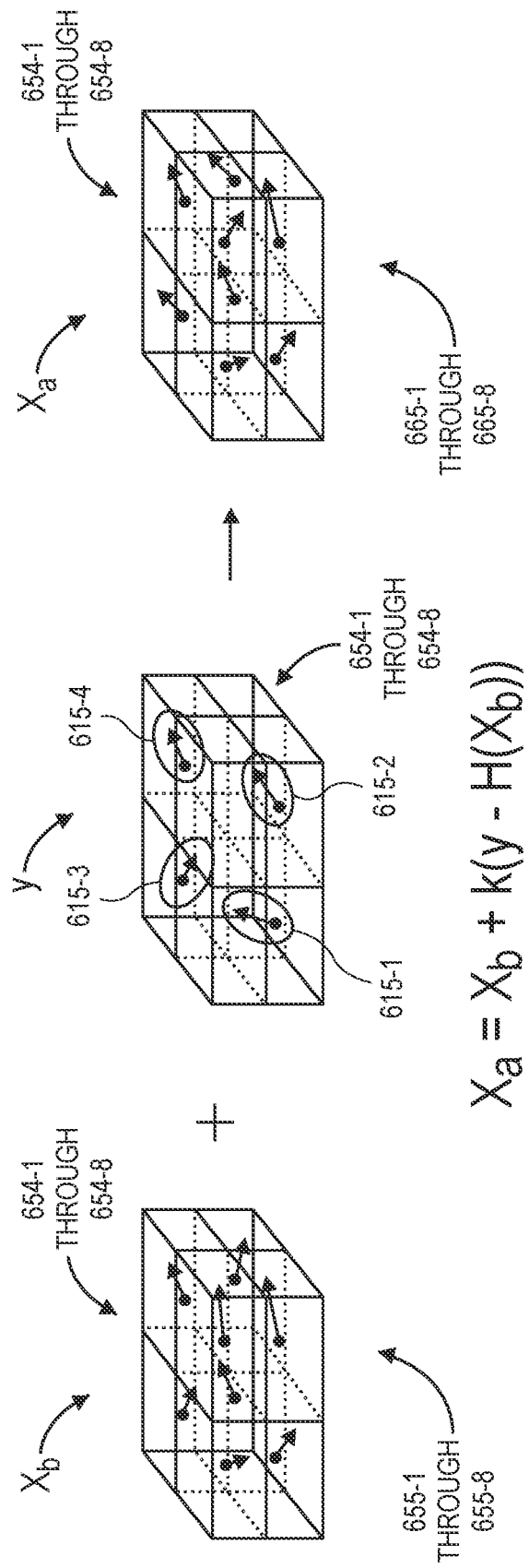

Referring to FIGS. 6A through 6C, views of aspects of one system for forecasting wind conditions in accordance with implementations of the present disclosure are shown. Except where otherwise noted, reference numerals preceded by the number "6" shown in FIGS. 6A through 6C indicate components or features that are similar to components or features having reference numerals preceded by the number "4" shown in FIGS. 4A through 4E, by the number "2" shown in the block diagram of FIG. 2 or by the number "1" shown in FIGS. 1A through 1J.

As is shown in FIG. 6A, a grid 650 is defined in three-dimensional space over a ground region 630. The grid 650 includes a plurality of cells 654-1 through 654-8 arranged in two layers over portions 634-1, 634-2, 634-3, 634-4 of the ground region 630. Additionally, the ground region 630 includes a variety of surface features, including a pair of sensors 625-1, 625-2 installed at selected locations within the ground region 630. In some implementations, each of the sensors 625-1, 625-2 may include one or more anemometers or other components for sensing wind conditions, as well as any number of processors, memory components, transceivers or other systems for capturing, processing or transmitting data to one or more external systems (not shown). In some implementations, the sensors 625-1, 625-2 may be configured to communicate via wired or wireless means, e.g., wired technologies such as USB or fiber optic cable, or standard wireless protocols or technologies such as cellular, Bluetooth® or any Wi-Fi protocol. Alternatively, the sensors 625-1, 625-2 may include one or more other components for determining information or data regarding weather or other environmental conditions, such as rain gauges, illuminance meters, thermometers, ceilometers, barometers, or other features.

The sensors 625-1, 625-2 may be mounted to one or more fixed or mobile components within the ground region 630 such as bridges, buildings, stanchions, utility systems (e.g., telephone poles or cellular towers), or other features, which may be provided on public or private property.

As is further shown in FIG. 6A, a plurality of predicted wind vectors 655-1 through 655-8 have been derived for each of the cells 655-1 through 655-8 of the grid 650. For example, in some implementations, the predicted wind vectors 655-1 through 655-8 may have been derived from a set of predicted wind vectors associated with cells of a grid having a lower resolution than the grid 650 that were obtained from a governmental agency, from a private service, or from any other source. The grid 650 and the predicted wind vectors 655-1 through 655-8 may be derived by downscaling such a grid or such predicted wind vectors based on the altitudes at which such vectors were predicted and surface roughness metrics of the portions 634-1, 634-2, 634-3, 634-4, among other factors.

As is shown in FIG. 6B, a plurality of wind vectors 615-1, 615-2, 615-3, 615-4, or $u_1$, $u_2$, $u_3$, $u_4$, are observed over the ground region 630 and transmitted to an external computer system 680 (e.g., a server) over one or more networks 690. For example, the wind vectors 615-1, 615-2 are captured by the weather sensors 625-1, 625-2, while the wind vectors 615-3, 615-4 are captured by sensors provided aboard aerial vehicles 610-1, 610-2. The plurality of wind vectors 615-1, 615-2, 615-3, 615-4 may include data representing speeds and directions of wind flow, or, alternatively, speeds of wind flow along axes within a two-dimensional plane or in three-dimensional space from which directions of the wind flow may be derived.

Observed wind vectors may be assimilated into predicted wind vectors by optimal interpolation, variational data assimilation, or by any other technique in accordance with implementations of the present discourse. As is shown in FIG. 6C, the plurality of predicted wind vectors 655-1 through 655-8 shown in FIG. 6A, or ($X_b$), and the plurality of observed wind vectors 615-1, 615-2, 615-3, 615-4 shown in FIG. 6B, or y, are assimilated by an optimal interpolation function, resulting in a corrected set of wind vectors 665-1 through 665-8, or ($X_a$), by an optimal interpolation function, whereby a Kalman gain weighting matrix K is applied to a difference between the observed wind vectors y and values of the background predicted wind vectors $H(X_b)$ at locations corresponding to the observed wind vectors y, or $(X_a)=(X_b)+K(y-H(X_b))$. The Kalman gain weighting matrix K may be given by a background error covariance in the observation space multiplied by an inverse of a total error covariance.

Whether one or more missions may be safely and reliably performed over the ground region 630 may be determined based on the corrected set of wind vectors 665-1 through 665-8, or ($X_a$). For example, where one or more of the corrected set of wind vectors 665-1 through 665-8, or ($X_a$), are less than a predetermined limit or threshold, spaces above the ground region 630 may be presumed to be safe for the reliable performance of one or more missions by aerial vehicles. Alternatively, where one or more of the corrected set of wind vectors 665-1 through 665-8, or ($X_a$), are above the predetermined limit or threshold, spaces above the ground region 630 may be presumed to be unsafe for the reliable performance of one or more missions by aerial vehicles.

The limits or thresholds by which predictions of safety or reliability of missions are made may be selected on any basis. For example, such limits or thresholds may be selected for a single aerial vehicle, or a single class of aerial vehicles, e.g., based on design requirements or features of the aerial vehicle or the class. The limits or thresholds may also be selected for a single region, or for multiple regions, based on attributes or features of the region or regions. The limits or thresholds may also be established by one or more government agencies, or in accordance with one or more laws, statutes, ordinances or regulations. Alternatively, the limits or thresholds may be selected on any other basis.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the processes represented in the flow charts of FIG. 3 or FIG. 5, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A system comprising:

a computer system having one or more computer processors and one or more data stores; and a plurality of components in communication with the computer system, and wherein the computer system is programmed with one or more sets of instructions that, when executed, cause the computer system to execute a method comprising:

identifying a first set of wind velocities, wherein each one of the wind velocities of the first set is a predicted wind velocity in a location over one portion of a ground region corresponding to one of a first plurality of cells of a first grid at a first time, and wherein each of the first plurality of cells is provided at a first altitude above the ground region and has a first resolution;

determining a first set of surface roughness metrics, wherein each one of the surface roughness metrics of the first set corresponds to one portion of the ground region below at least one of the first plurality of cells of the first grid at the first time;

generating a second grid having a second plurality of cells, wherein each one of the second plurality of cells is provided at one of a plurality of altitudes above one portion of the ground region and has a second resolution, and wherein the second resolution is greater than the first resolution;

determining a second set of surface roughness metrics, wherein each one of the surface roughness metrics of the second set corresponds to one portion of the ground region below at least one of the second plurality of cells of the second grid at the first time;

calculating a second set of wind velocities based at least in part on the first set of wind velocities, the first set of surface roughness metrics, and the second set of surface roughness metrics, wherein each one of the wind velocities of the second set is a predicted wind velocity in a location over one portion of the ground region corresponding to one of the second plurality of cells of the second grid;

receiving, from the plurality of components, a third set of wind velocities, wherein each one of the wind velocities of the third set is a wind velocity sensed by one of the plurality of components at a location over the ground region at approximately the first time;

calculating a fourth set of wind velocities based at least in part on the second set of wind velocities and the third set of wind velocities, wherein the fourth set of wind velocities comprises the third set of wind velocities assimilated into the second set of wind velocities, and wherein each one of the wind velocities of the fourth set is a predicted wind velocity in a location over one portion of the ground region corresponding to one of the second plurality of cells of the second grid;

identifying a fifth set of wind velocities, wherein each one of the wind velocities of the fifth set is a predicted wind velocity in a location over one portion of the ground region corresponding to one of the second plurality of cells of the second grid at a second time, wherein the second time follows the first time;

providing at least the fourth set of wind velocities, the fifth set of wind velocities and the second set of surface roughness metrics as inputs to a trained gradient-boosted decision trees algorithm;

receiving at least one output from the trained gradient-boosted decision trees algorithm in response to the inputs;

generating, based at least in part on the at least one output, a representation of wind velocities over a period of time between the first time and at least the second time; and executing at least one operational decision regarding a first aerial vehicle based at least in part on the representation of wind velocities.

2. The system of claim 1, wherein each of the first plurality of cells has a length of three kilometers and a width of three kilometers, and wherein each of the second plurality of cells has a length of one kilometer and a width of one kilometer.

3. The system of claim 1, wherein calculating the fourth set of wind velocities comprises:

determining locations of each of the third set of wind velocities;

identifying, for each one of the locations, a cell of the second plurality of cells corresponding to the one of the locations;

identifying wind velocities of the second set of wind velocities in the cells of the second plurality of cells corresponding to the locations; and calculating a product of a gain weighting matrix and a difference between at least the wind velocities of the third set of wind velocities and the wind velocities of the second set of wind velocities in the cells of the second plurality of cells corresponding to the locations, wherein the fourth set of wind velocities is calculated as a sum of the second set of wind velocities and the product.

4. The system of claim 1, wherein executing the at least one operational decision comprises at least one of:

selecting the first aerial vehicle of a plurality of aerial vehicles to perform a mission based at least in part on the representation of wind velocities;

selecting at least one of a course, a speed or an altitude of the first aerial vehicle over the ground region based at least in part on the representation of wind velocities;

determining that the first aerial vehicle may perform a mission over the ground region based at least in part on the representation of wind velocities;

determining that the first aerial vehicle may not perform a mission over the ground region based at least in part on the representation of wind velocities; or predicting a time required for the first aerial vehicle to perform a mission based at least in part on the representation of wind velocities.

5. The system of claim 1, wherein each of the plurality of components is one of:

a second aerial vehicle;

a sensor provided in association with a building;

a sensor mounted to a free-standing structure;

a sensor mounted to a tree; or a sensor provided in association with a utility system.

6. A method comprising:

identifying, by a first computer system, a first wind vector calculated for a first space above a ground region, wherein the first wind vector is a predicted wind vector for the first space at a first time, wherein the first space corresponds to a first grid having a first level of resolution, and wherein the first space is provided at a first altitude;

determining, by the first computer system, at least a first roughness metric for a first portion of the ground region below the first space;

generating, by the first computer system, a second grid comprising a second plurality of spaces, wherein the second grid has a second level of resolution, wherein the second level of resolution is greater than the first level of resolution, and wherein each one of the second plurality of spaces is provided over the first portion of the ground region;

determining, by the first computer system, a second plurality of roughness metrics, wherein each one of the second plurality of roughness metrics is determined for one of a second plurality of portions of the ground region below one of the second plurality of spaces, and wherein each of the second plurality of portions of the ground region is included in the first portion of the ground region;

calculating, by the first computer system, a second set of wind vectors, wherein each of the second set of wind vectors is a predicted wind vector for one of the second plurality of spaces at the first time, and wherein each of the second set of wind vectors is calculated based at least in part on the first wind vector, the first roughness metric and one of the second plurality of roughness metrics determined for one of the second plurality of portions of the ground region below the one of the second plurality of spaces;

receiving, by the first computer system, data representing a second wind vector observed by a sensor provided in a first location above the ground region at the first time;

identifying, by the first computer system, at least a third wind vector calculated for the first space above the ground region, wherein the third wind vector is a predicted wind vector for the first space at a second time, and wherein the second time follows the first time;

generating, by the first computer system, a representation of wind vectors above the ground region over a period of time including at least the first time and the second time based at least in part on the second set of wind vectors, the second wind vector, the third wind vector, the first roughness metric, and the second plurality of roughness metrics; and executing, by the first computer system, at least one operational decision for a first aerial vehicle based at least in part on the representation of wind vectors.

7. The method of claim 6, wherein identifying at least the third wind vector calculated for the first space above the ground region comprises:

calculating, by the first computer system, a third set of wind vectors, wherein each of the third set of wind vectors is a predicted wind vector for one of the second plurality of spaces at the second time, and wherein each of the third set of wind vectors is calculated based at least in part on the third wind vector, the first roughness metric and one of the second plurality of roughness metrics determined for one of the second plurality of portions of the ground region below the one of the second plurality of spaces, wherein the representation of wind vectors above the ground region over the period of time is generated based at least in part on the third set of wind vectors.

8. The method of claim 6, wherein each of the first wind vector and the third wind vector is generated by one of the High-Resolution Rapid Response model or the European Centre for Medium-Range Weather Forecasts model.

9. The method of claim 6, wherein the first roughness metric is a surface roughness length selected for the first portion of the ground region.

10. The method of claim 6, wherein the first space has a first length and a first width, wherein each of the second plurality of spaces has a second length and a second width, wherein the first length is greater than the second length, and wherein the first width is greater than the second width.

11. The method of claim 10, wherein each of the first length and the first width is three kilometers, and wherein each of the second length and the second width is one kilometer.

12. The method of claim 6, wherein each of the second plurality of spaces is provided at one of a plurality of altitudes above the first portion of the ground region.

13. The method of claim 6, wherein calculating the second set of wind vectors comprises performing a transformation of the first wind vector based at least in part on the first altitude, the first roughness metric, the second plurality of roughness metrics, and altitudes of each of the second plurality of spaces.

14. The method of claim 6, wherein calculating the second set of wind vectors comprises, for each one of the second plurality of spaces, dividing a product of the first wind vector and a natural log of an altitude of the one of the second plurality of spaces divided by one of the second plurality of roughness metrics corresponding to a portion of the ground region below the one of the second plurality of spaces by a natural log of the altitude of the one of the second plurality of spaces divided by the first roughness metric.

15. The method of claim 6, further comprising:

generating a third set of wind vectors, wherein generating the third set of wind vectors comprises:

identifying one of the second plurality of spaces corresponding to the first location; and calculating a product of a gain weighting matrix and a difference between the first wind vector and one of the second set of wind vectors calculated for the one of the second plurality of spaces, wherein the third set of wind vectors is generated as a sum of the second set of wind vectors and the product, and wherein the representation of wind vectors is generated based at least in part on the third set of wind vectors.

16. The method of claim 15, wherein generating the representation of wind vectors comprises:

providing at least the third set of wind vectors, the third wind vector, the first altitude, the first roughness metric and the second plurality of roughness metrics as inputs to a gradient-boosted decision trees model; and generating the representation of wind vectors based at least in part on outputs received in response to the inputs.

17. The method of claim 6, wherein the sensor is associated with one of:

an airborne uncrewed aerial vehicle at the first location;

a building at the first location;

a free-standing structure at the first location;

a tree at the first location; or a utility system at the first location.

18. A method comprising:

identifying, by a computer system, a first plurality of sets of wind velocities, wherein the first plurality of sets of wind velocities comprises:

wind velocities in each of a first plurality of cells of a first grid over a ground region predicted for a first time, wherein each of the first plurality of cells has a first length and a first width, and wherein each of the first plurality of cells is at a first altitude over the ground region;

wind velocities in each of the first plurality of cells of the first grid predicted for a second time, wherein the second time follows the first time; and wind velocities in each of the first plurality of cells of the first grid predicted for a third time, wherein the third time follows the second time;

determining, by the computer system, a first set of surface roughness metrics for the ground region, wherein each of the first plurality of cells is provided over a portion of the ground region corresponding to one of the first set of surface roughness metrics;

generating, by the computer system, a second grid over the ground region, wherein the second grid has a second plurality of cells, wherein each of the second plurality of cells has a second length and a second width, and wherein each of the second plurality of cells is provided over the ground region;

determining, by the computer system, a second set of surface roughness metrics for the ground region, wherein each of the second plurality of cells is provided over a portion of the ground region corresponding to one of the second set of surface roughness metrics;

calculating, by the computer system, a second plurality of sets of wind velocities based at least in part on the first plurality of sets of wind velocities, the first set of surface roughness metrics, and the second set of surface roughness metrics, wherein the second plurality of sets of wind velocities comprises:

wind velocities in each of the second plurality of cells of the ground region predicted for the first time;

wind velocities in each of the second plurality of cells of the ground region predicted for the second time; and wind velocities in each of the second plurality of cells of the ground region predicted for the third time;

receiving, by the computer system, data representing a plurality of wind velocities observed at the first time, wherein each of the plurality of wind velocities was captured by a sensor at a location over the ground region at the first time;

assimilating the plurality of wind velocities observed at the first time into the wind velocities in each of the second plurality of cells of the ground region predicted for the first time;

providing at least the second plurality of sets of wind velocities, the second set of surface roughness metrics and altitudes of each of the second plurality of cells as inputs to a gradient-boosted decision trees algorithm;

receiving outputs from the gradient-boosted decision trees algorithm in response to the inputs; and generating a representation of predicted wind velocities over the ground region for a period of time including at least the first time, the second time and the third time based at least in part on the outputs.

19. The method of claim 18, wherein the first length and the first width are three kilometers, and wherein the second length and the second width are one kilometer.

20. The method of claim 18, further comprising:

executing, by the computer system, at least one operational decision for a first aerial vehicle based at least in part on the representation of predicted wind velocities, wherein the at least one operational decision comprises at least one of:

selecting the first aerial vehicle of a plurality of aerial vehicles to perform a mission;

selecting at least one of a course, a speed or an altitude of the first aerial vehicle over the ground region;

determining that the first aerial vehicle may perform a mission over the ground region;

determining that the first aerial vehicle may not perform a mission over the ground region; or predicting a time required for the first aerial vehicle to perform a mission.

* * * * *